US006875369B1

(12) United States Patent
Tidrow et al.

(10) Patent No.: US 6,875,369 B1
(45) **Date of Patent: *Apr. 5, 2005**

(54) FERROELECTRIC/PARAELECTRIC MATERIALS, AND PHASE SHIFTER DEVICES, TRUE TIME DELAY DEVICES AND THE LIKE CONTAINING SAME

(75) Inventors: Steven C. Tidrow, Silver Spring, MD (US); Daniel M. Potrepka, Silver Spring, MD (US); Arthur Tauber, Elberon, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/307,528

(22) Filed: Nov. 26, 2002

Related U.S. Application Data

(60) Provisional application No. 60/332,540, filed on Nov. 26, 2001, and provisional application No. 60/332,535, filed on Nov. 26, 2001.

(51) Int. Cl.[7] .......... C04B 35/49

(52) U.S. Cl. .......... 252/62.9 R; 501/134; 501/135; 501/136; 501/137

(58) Field of Search .......... 252/62.9 R; 501/134, 501/136, 137, 139

(56) References Cited

U.S. PATENT DOCUMENTS 2,420,692 A * 5/1947 Wainer .......... 501/136
2,616,989 A * 11/1952 Hepp .......... 330/7
6,583,688 B2 * 6/2003 Klee et al. .......... 331/188
6,641,940 B1 * 11/2003 Li et al. .......... 428/702

* cited by examiner

*Primary Examiner*—C. Melissa Koslow
(74) *Attorney, Agent, or Firm*—William V. Adams

(57) ABSTRACT

Single-phase, non-cubic and single-phase, cubic ferroelectric/paraelectric lead-based perovskite-structured materials having reasonably low and fairly temperature insensitive dielectric constants (stable dielectric constants over a wide range of operating temperatures of –80° C. to 100° C.), reasonable loss tangents ($<\sim 10^{-1}$), high tunability, and significantly lowered Curie temperature below the temperature range of operation for previous undoped perovskite structures are provided. The FE/PE materials of the present invention have dilute charge-compensated substitutions in the Ti site of the perovskite structure. This single-phase structure or a variant of it with a Ti rich composition, provided herein, allows for pulsed-laser-deposition of a thin film with uniform transfer of the structure of the target into the deposited film, which enables production of very small, lightweight devices that are extremely efficient and consume little power. These ferroelectric/paraelectric materials may be used in phase shifter devices (such as used in cell phones, antennas and the like), variable true time delay devices, steerable beams, tunable filters, impedance transformers, variable control oscillators, antennas, radios, filters, microwave variable capacitors, radar systems, electronic warfare sensors, resonators, microwave transverse-electromagnetic-ferroelectric voltage-controlled oscillators, and other RF, microwave, or millimeter wave tunable devices for synthesizers and systems incorporating all of the above, as well as any application that enhances the performance of various types of electrical and electro-optic devices.

12 Claims, 40 Drawing Sheets

A Site

Oxygen Site

B Site

TABLE I.

| $Ba_x$ | Wt% Oxide | % Tunability | ε | | Tan(δ) | $\varepsilon_{eff}$ | | Impedance | | Conductor Loss (dB/cm) | Dielectric Loss (dB/cm) | Total Loss (dB/cm) | 360° Phase Shift Length (cm) | Total Loss (dB) |
|---|---|---|---|---|---|---|---|---|---|---|---|---|---|---|
| 0.6 | 0 | 56.3 | 1002 | 438 | 0.0908 | 629 | 276 | 5.04 | 7.83 | 2.09 | 21.11 | 23.20 | 0.35 | 8.1 |
| 0.6 | 60 | 10.0 | 118 | 106 | 0.0129 | 74 | 67 | 14.7 | 15.5 | 0.72 | 1.03 | 1.75 | 7.19 | 12.6 |

Parameters for the simulated 10 GHz phase shifter using a microstrip design with a 3-mil-thick BST/MgO composite material (Wt% oxide = 60) compared to BST (Wt% Oxide = 0), and a 3-mil-wide 1 oz. copper line and a bias condition of 2 V/μm. Presented and published prior to Nov 30, 2000: S.C. Tidrow et al., Integrated Ferroelectrics Vol 28, p. 151 (2000).

Fig. 4

$Ba_{1-x}Sr_x(Z_yZ'_y)Ti_{1-2y+\delta}O_3$ with $x = 0.4$, $\delta = 0$, $y = 0.015$, and $Z = Z' = X$.

$Ba_{1-x}Sr_x(Z_yZ_y')Ti_{1-2y+\delta}O_3$ with $x = 0.4$, $\delta = 0$, $y = 0.03$, $Z = X$, and $Z' = V$.

$Ba_{1-x}Sr_x(Z_yZ_y')Ti_{1-2y+\delta}O_3$ with $x = 0.4$, $\delta = 0$, $y = 0.03$, $Z = X$, and $Z' = Sb$.

$Ba_{1-x}Sr_x(Z_yZ_y')Ti_{1-2y+\delta}O_3$ with $x = 0.4$, $\delta = 0$, $y = 0.03$, $Z = X$, and $Z' = Ta$.

$Ba_{1-x}Sr_x(Z_yZ_y')Ti_{1-2y+\delta}O_3$ with $x = 0.4$, $\delta = 0$, $y = 0.05$, $Z = X$, and $Z' = Ta$.

Table II.

| Samples Synthesized with $x = 0.4$ Sr Content | |
|---|---|
| **BST64 Control Sample, 3 and 6 % Substitution for Ti:** | |
| $Ba_{0.6}Sr_{0.4}TiO_3$ (BST64) | $Ba_{0.6}Sr_{0.4}Al_{0.03}Sb_{0.03}Ti_{0.94}O_3$ |
| $Ba_{0.6}Sr_{0.4}Ge_{0.03}Ti_{0.97}O_3$ | $Ba_{0.6}Sr_{0.4}In_{0.03}Sb_{0.03}Ti_{0.94}O_3$ |
| $Ba_{0.6}Sr_{0.4}Sn_{0.03}Ti_{0.97}O_3$ | $Ba_{0.6}Sr_{0.4}Sc_{0.03}Sb_{0.03}Ti_{0.94}O_3$ |
| $Ba_{0.6}Sr_{0.4}Zr_{0.03}Ti_{0.97}O_3$ | $Ba_{0.6}Sr_{0.4}Y_{0.03}Sb_{0.03}Ti_{0.94}O_3$ |
| $Ba_{0.6}Sr_{0.4}Al_{0.03}V_{0.03}Ti_{0.94}O_3$ | $Ba_{0.6}Sr_{0.4}Al_{0.03}Ta_{0.03}Ti_{0.94}O_3$ |
| $Ba_{0.6}Sr_{0.4}Ga_{0.03}V_{0.03}Ti_{0.94}O_3$ | $Ba_{0.6}Sr_{0.4}Ga_{0.03}Ta_{0.03}Ti_{0.94}O_3$ |
| $Ba_{0.6}Sr_{0.4}In_{0.03}V_{0.03}Ti_{0.94}O_3$ | $Ba_{0.6}Sr_{0.4}In_{0.03}Ta_{0.03}Ti_{0.94}O_3$ |
| $Ba_{0.6}Sr_{0.4}Sb_{0.03}V_{0.03}Ti_{0.94}O_3$ | $Ba_{0.6}Sr_{0.4}Y_{0.03}Ta_{0.03}Ti_{0.94}O_3$ |
| $Ba_{0.6}Sr_{0.4}Sc_{0.03}V_{0.03}Ti_{0.94}O_3$ | |
| $Ba_{0.6}Sr_{0.4}Y_{0.03}V_{0.03}Ti_{0.94}O_3$ | |
| **10 % Substitution for Ti:** | |
| $Ba_{0.6}Sr_{0.4}Sc_{0.05}Ta_{0.05}Ti_{0.90}O_3$ | |
| $Ba_{0.6}Sr_{0.4}Y_{0.05}Ta_{0.05}Ti_{0.90}O_3$ | |

Fig. 12

Fig. 14(a)
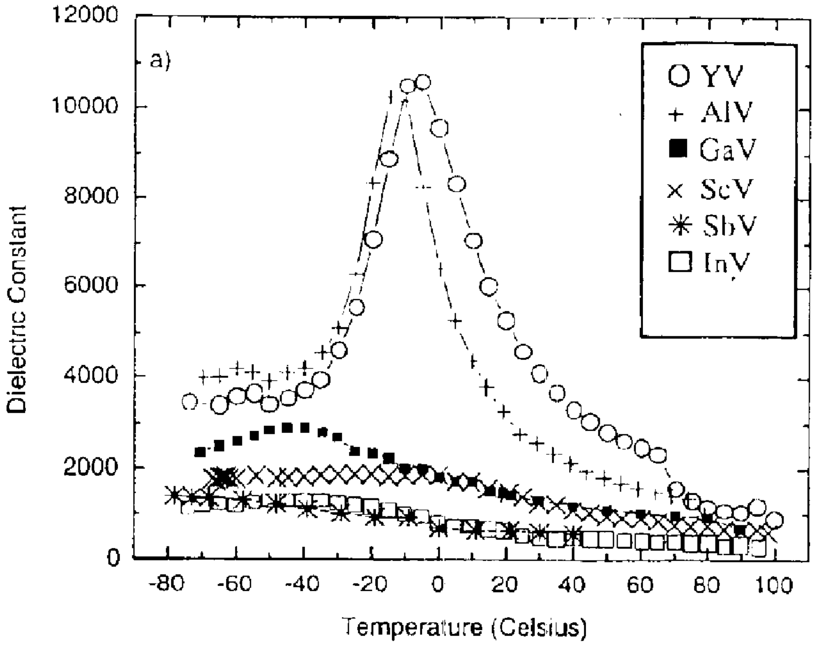
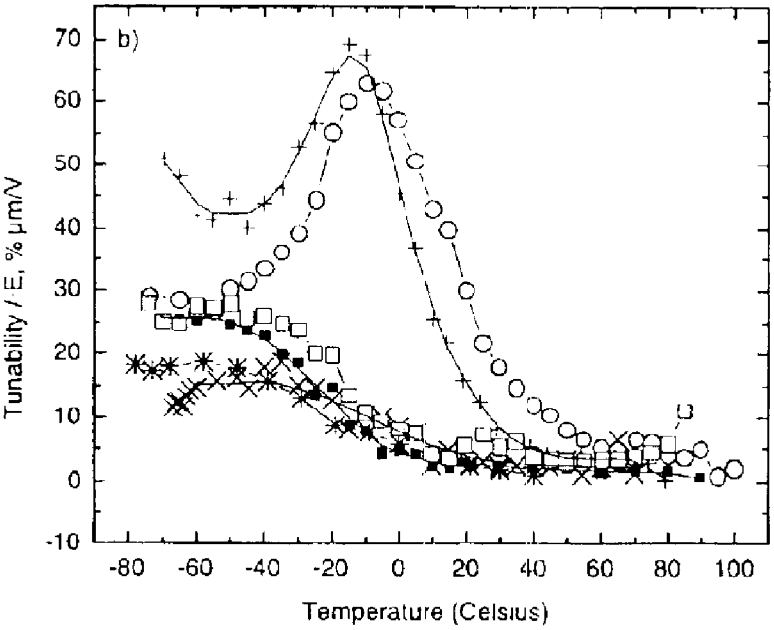
Fig. 14(b)

Fig. 15(a)
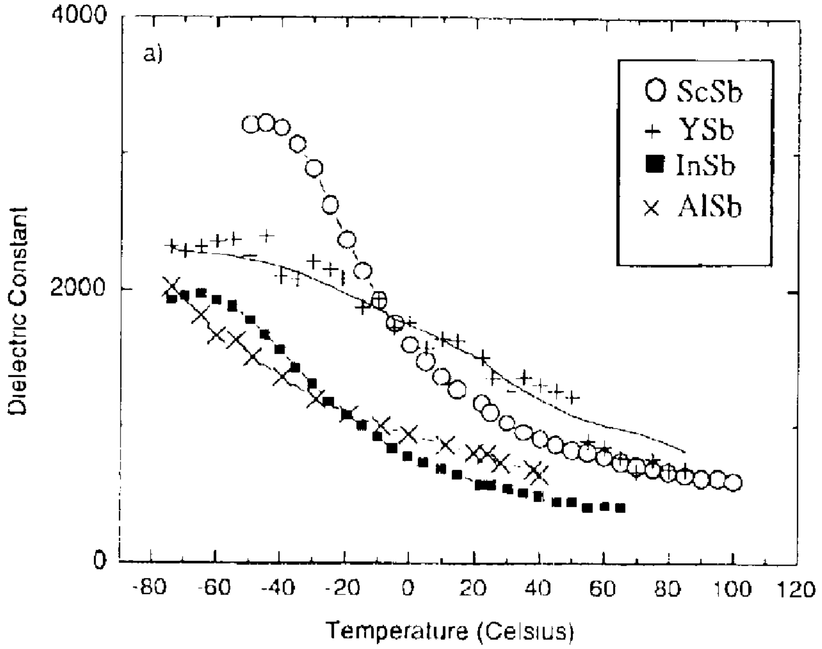
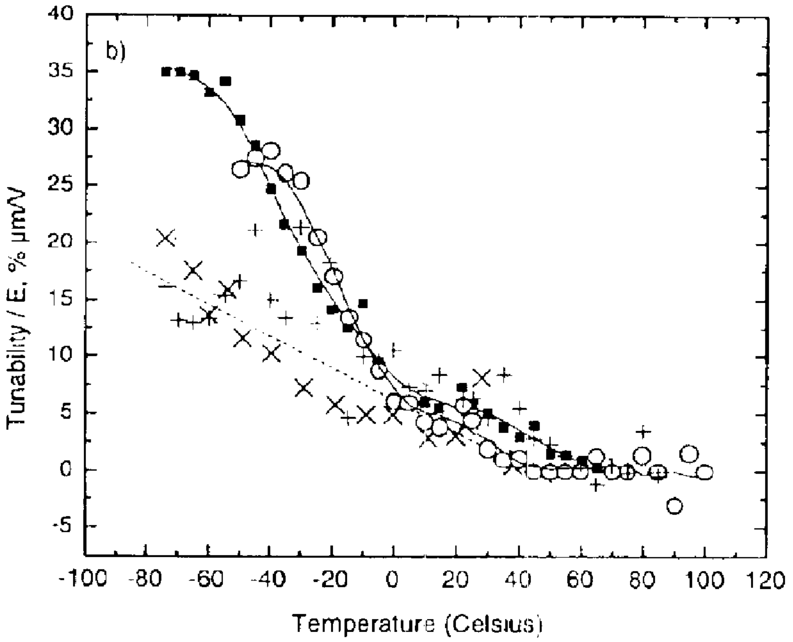
Fig. 15(b)

Fig. 16(a)
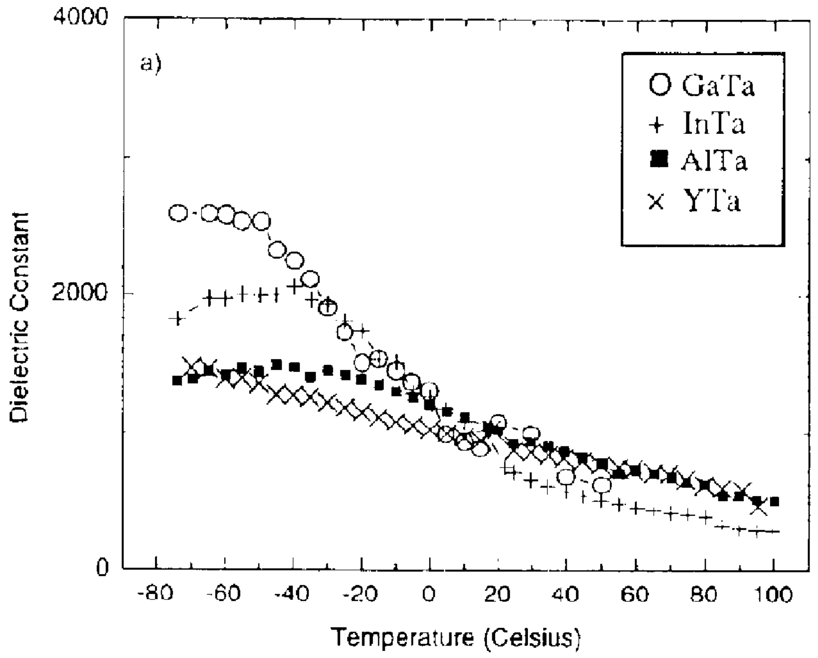
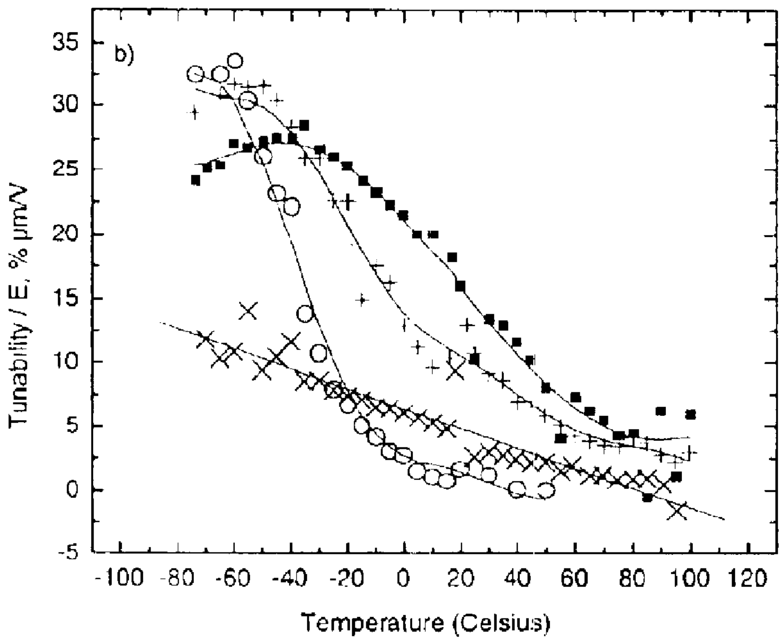
Fig. 16(b)

TABLE III.

Dielectric Constant, Tunability, Temperature Ranges and Critical Temperature

| | $\varepsilon$ | $\frac{\%Tun}{E}\left[\%\cdot\frac{\mu m}{V}\right]$ | $T_{min}$, $T_{max}$ (°C) | $T_c^{E-0}$ (°C) |
|---|---|---|---|---|
| **Reference Samples** | | | | |
| BST64 | 2200-800 | 41-0 | −20, 60 | 5 |
| BSTMgO | 200-100 | 9-1 | −75, 100 | −30 |
| **3 % Substitution of 4+ Valence Ions for Ti in BST64** | | | | |
| Ge | 1100-200 | 39-0 | −75, 85 | −5 |
| Sn | 1600-500 | 41-0 | −40, 50 | −10 |
| Zr | 2000-700 | 47-0 | −30, 80 | 2 |
| **3 and 5 % Substitution of (3+, 5+) Pairs for Ti at % Indicated** | | | | |
| AlV (6%) | 10500-1000 | 70-2 | −75, 100 | −12 |
| GaV (6%) | 2800-500 | 25-0 | −75, 100 | −40 |
| InV (6%) | 1350-200 | 28-5 | −75, 95 | −45 |
| SbV (6%) | 1400-500 | 19-0 | −75, 40 | < −75 |
| ScV (6%) | 1800-500 | 17-2 | −75, 100 | ≤ −10 |
| YV (6%) | 11000-0 | 65-0 | −75, 100 | −10 |
| AlSb (6%) | 2000-600 | 20-0 | −75, 100 | < −75 |
| InSb (6%) | 2000-200 | 35-0 | −75, 100 | −60 |
| ScSb (6%) | 3250-500 | 20-0 | −60, 100 | −45 |
| YSb (6%) | 2400-700 | 17-0 | −75, 100 | ≲ −60 |
| AlTa (6%) | 1500-450 | 12.5-0 | −75, 100 | < −75 |
| GaTa (6%) | 2600-600 | 33-0 | −75, 100 | < −75 |
| InTa (6%) | 2000-250 | 32-2 | −75, 100 | −40 |
| YTa (6%) | 1500-500 | 28-3 | −75, 100 | < −75 |
| ScTa (10%) | 1700-300 | 31-8 | −75, 95 | < −75 |
| YTa (10%) | 850-350 | 14-2 | −75, 100 | < −75 |

BST64 = $Ba_{0.6}Sr_{0.4}TiO_3$
BSTMgO = 40 Wt% BST64 + 60 Wt% MgO

Fig. 24

TABLE IV.

Tunability Results for Sr/Ba Ratio 0, 1/9, 2/8

| Composition | ε | $\frac{\%Tun}{E}\left[\frac{\mu m}{V}\right]$ | $T_{min}, T_{max}$ (°C) | $T_C^{E=0}$(°C) | |
|---|---|---|---|---|---|
| $BaMg_{0.05}Mo_{0.05}Ti_{0.9}O_3$ | 1680-500 | 10-5 | -75, 100 | <-75 | |
| $Ba_{0.9}Sr_{0.1}Sc_{0.05}Ta_{0.05}Ti_{0.99}O_{3+y}$ | 450-400 | 9-6 | -75, 100 | <-75 | SCTAT000627 |
| $Ba_{0.9}Sr_{0.1}Sc_{0.05}Ta_{0.05}Ti_{0.9}O_3$ | 1125-625 | 23-12 | -75, 100 | <-75 | DP000807 |
| $Ba_{0.9}Sr_{0.1}Al_{0.05}Ta_{0.05}Ti_{0.9}O_3$ | 300-230 | 2.3-1.7 | 20, 100 | <20 | SCTAT051600G |
| $Ba_{0.9}Sr_{0.1}Al_{0.05}Ta_{0.05}Ti_{0.9}O_3$ | 600-500 | 7-5 | -50, 100 | <-50 | SCTAT82 |
| $Ba_{0.9}Sr_{0.1}Al_{0.05}Ta_{0.05}Ti_{0.9}O_3$ | 1800-1200 | 11 | -73, 23 | <-75 | SCTAT051100C |
| 95%$Ba_{0.9}Sr_{0.1}Sc_{0.05}Ta_{0.05}Ti_{0.9}O_3$† | 720-550 | ~2 | 15, 95 | <15 | |
| 85%$Ba_{0.9}Sr_{0.1}Sc_{0.05}Ta_{0.05}Ti_{0.9}O_3$† | 610-475 | ~2 | 15, 100 | <15 | |
| $Ba_{0.95}Sr_{0.05}Al_{0.10}Ta_{0.10}Ti_{0.80}O_3$ | 625-300 | ~2 | -75, 100 | <-75 | |
| $Ba_{0.9}Sr_{0.1}In_{0.1}Sb_{0.1}Ti_{0.8}O_3$ | 725-350 | 7-2 | -75, 100 | <-75 | |
| $Ba_{0.9}Sr_{0.1}Zn_{0.05}W_{0.05}Ti_{0.9}O_3$ | 1500-700 | 33-6 | -75, 90 | $\leq$ -35 | |
| $Ba_{0.8}Sr_{0.2}In_{0.05}Ta_{0.05}Ti_{0.9}O_3$ | 1150-400 | 16-1 | -75, 100 | -25 | |
| $Ba_{0.9}Sr_{0.1}Al_{0.075}Ta_{0.075}Ti_{0.85}O_3$ | 1100-600 | 3.5-1.7 | -75, 100 | <-75 | |
| $Ba_{0.8}Sr_{0.2}Ga_{0.05}Ta_{0.05}Ti_{0.9}O_3$ | 1800-500 | 18-1.5 | -75, 100 | $\leq$ -50 | |
| $Ba_{0.8}Sr_{0.2}Y_{0.05}Ta_{0.05}Ti_{0.9}O_3$ | 1250-700 | 18-5 | -75, 100 | -33 | |
| $Ba_{0.9}Sr_{0.1}Lu_{0.1}Ta_{0.1}Ti_{0.8}O_3$ | 1500-600 | 17-2 | -50, 100 | <-50 | |
| $Ba_{0.9}Sr_{0.1}Y_{0.05}Ta_{0.05}Ti_{0.9}O_3$ | 1500-900 | 23-10 | -75, 100 | -8 | |
| $Ba_{0.8}Sr_{0.2}Al_{0.1}Ta_{0.1}Ti_{0.8}O_3$ | 4750-625 | 52-1.5 | -75, 100 | -50 | |
| $Ba_{0.9}Sr_{0.1}Lu_{0.05}Ta_{0.05}Ti_{0.9}O_3$ | 2800-1200 | 39-7 | -75, 100 | 6 | |
| $Ba_{0.9}Sr_{0.1}In_{0.05}Sb_{0.05}Ti_{0.9}O_3$ | 8500-1000 | 64-6 | -50, 100 | <-50 | |
| $Ba_{0.9}Sr_{0.1}Al_{0.025}Ta_{0.025}Ti_{0.95}O_3$ | 4400-1800 | 28-3.3 | -75, 100 | -10 | |

† Balance MgO

Tunability Results for Sr/Ba ratio 4/6

| Composition | ε | $\frac{\%Tun}{E}\left[\frac{\mu m}{V}\right]$ | $T_{min}, T_{max}$ (°C) | $T_C^{E=0}$(°C) | |
|---|---|---|---|---|---|
| $Ba_{0.6}Sr_{0.4}TiO_3$ | 2200-800 | 41-0 | -20, 60 | 5 | |
| $Ba_{0.6}Sr_{0.4}TiO_3$ + 60Wt%MgO | 200-100 | 9-1 | -75, 100 | ~-30 | (Sengupta Sample) |
| $Ba_{0.6}Sr_{0.4}Ge_{0.03}Ti_{0.97}O_3$ | 1100-200 | 39-0 | -75, 85 | -5 | |
| $Ba_{0.6}Sr_{0.4}Sn_{0.03}Ti_{0.97}O_3$ | 1600-500 | 41-0 | -40, 50 | -10 | |
| $Ba_{0.6}Sr_{0.4}Zr_{0.03}Ti_{0.97}O_3$ | 2000-700 | 47-0 | -30, 80 | 2 | |
| $Ba_{0.6}Sr_{0.4}Y_{0.05}Ta_{0.05}Ti_{0.90}O_3$ | 850-350 | 14-2 | -75, 100 | <-75 | |
| $Ba_{0.6}Sr_{0.4}In_{0.03}V_{0.03}Ti_{0.94}O_3$ | 1350-200 | 28-5 | -75, 95 | -45 | |
| $Ba_{0.6}Sr_{0.4}Sb_{0.03}V_{0.03}Ti_{0.94}O_3$ | 1400-500 | 19-0 | -75, 40 | <-75 | |
| $Ba_{0.6}Sr_{0.4}Al_{0.03}Ta_{0.03}Ti_{0.94}O_3$ | 1500-450 | 12.5-0 | -75, 100 | <-75 | |
| $Ba_{0.6}Sr_{0.4}Y_{0.03}Ta_{0.03}Ti_{0.94}O_3$ | 1500-500 | 28-3 | -75, 100 | < 75 | |
| $Ba_{0.6}Sr_{0.4}Sc_{0.05}Ta_{0.05}Ti_{0.90}O_3$ | 1700-300 | 31-8 | -75, 95 | <-75 | |
| $Ba_{0.6}Sr_{0.4}Sc_{0.03}V_{0.03}Ti_{0.94}O_3$ | 1800-500 | 17-2 | -75, 100 | $\leq$-10 | |
| $Ba_{0.6}Sr_{0.4}In_{0.03}Ta_{0.03}Ti_{0.94}O_3$ | 2000-250 | 32-2 | -75, 100 | -40 | |
| $Ba_{0.6}Sr_{0.4}In_{0.03}Sb_{0.03}Ti_{0.94}O_3$ | 2000-200 | 35-0 | -75, 100 | -60 | |
| $Ba_{0.6}Sr_{0.4}Al_{0.03}Sb_{0.03}Ti_{0.94}O_3$ | 2000-600 | 20-0 | -75, 100 | <-75 | |
| $Ba_{0.6}Sr_{0.4}Y_{0.03}Sb_{0.03}Ti_{0.94}O_3$ | 2400-700 | 17-0 | -75, 100 | $\leq$ -60 | |
| $Ba_{0.6}Sr_{0.4}Ga_{0.03}Ta_{0.03}Ti_{0.94}O_3$ | 2600-600 | 33-0 | -75, 100 | <-75 | |
| $Ba_{0.6}Sr_{0.4}Ga_{0.03}V_{0.03}Ti_{0.94}O_3$ | 2800-500 | 25-0 | -75, 100 | -40 | |
| $Ba_{0.6}Sr_{0.4}Sc_{0.03}Sb_{0.03}Ti_{0.94}O_3$ | 3250-500 | 20-0 | -60, 100 | -45 | |
| $Ba_{0.6}Sr_{0.4}Al_{0.03}V_{0.03}Ti_{0.94}O_3$ | 10000-1000 | 70-2 | -75, 100 | -12 | |
| $Ba_{0.6}Sr_{0.4}Y_{0.03}V_{0.03}Ti_{0.94}O_3$ | 11000-0 | 65-0 | -75, 100 | -10 | |

Fig. 25

TABLE V.

Figure of Merit

$$FOM = \frac{\Delta\varepsilon}{\Delta E} \Big/ \frac{\Delta\varepsilon}{\Delta T}, \left[{}^{\circ}C \cdot \frac{\mu m}{V}\right]$$

| Temperature→$T_{min}^{P}$ | | 20 °C | $T_{max}$ |
|---|---|---|---|
| **Reference Samples** | | | |
| BST64 | 32 | 12 | 0 |
| BSTMgO | 14.5 | 14.5 | 3 |
| **3 % Substitutions of 4+ Valence Ions for Ti in BST64** | | | |
| Ge | 27 | 5.3 | 0 |
| Sn | 31 | 4.9 | 0 |
| Zr | 41 | 18 | 2.6 |
| **3 and 5 % Substitution of (3+, 5+) Valence Ions for Ti at % Indicated** | | | |
| AlV (6%) | 25 | 5.2 | 0 |
| GaV (6%) | 42 | 2.1 | 0 |
| InV (6%) | 48 | 1.8 | 0 |
| SbV (6%) | 29 | 1.4 | 0 |
| ScV (6%) | 67.5 | 2.1 | 0 |
| YV (6%) | 28 | 10.5 | 1 |
| AlSb (6%) | 34.5 | 2.6 | 0 |
| InSb (6%) | 59.5 | 1.7 | 0 |
| ScSb (6%) | 45.5 | 3.0 | 0 |
| Ysb (6%) | 24 | 8.5 | 0 |
| AlTa (6%) | 37 | 15.5 | 2 |
| GaTa (6%) | 41.5 | 0.8 | 0.4 |
| InTa (6%) | 53 | 6.4 | 2.3 |
| YTa (6%) | 31.5 | 10 | 1 |
| ScTa (10%) | 52.5 | 12.5 | 2.9 |
| YTa (10%) | 17.5 | 9.3 | 2.5 |

BST64 = $Ba_{0.6}Sr_{0.4}TiO_3$
BSTMgO = 40 Wt% BST64 + 60 Wt% MgO

Fig. 26

TABLE VI.

Loss Tangent and ε at 20 °C

| | tanδ (1 kHz) | ε(1 kHz) | ε(1 MHz) |
|---|---|---|---|
| **Reference Measurements** | | | |
| BST64 | 0.0065 | 2874 | 1750 |
| RT/Duroid | 0.0065 | 5 | 9 |
| Open | 0.0025 | | |
| **4+ Valence Substitutions for Ti in BST64** | | | |
| Ge (3%) | 0.0045 | 1474 | 750 |
| Zr (3%) | 0.0055 | 3691 | 1570 |
| Sn (3%) | 0.0075 | 1990 | 1040 |
| **3 and 5 % Substitution of (3+, 5+) Valence Ions for Ti at % Indicated** | | | |
| AlV (6%) | 0.001 | 2689 | 2500 |
| GaV (6%) | 0.002 | 1145 | 1500 |
| InV (6%) | 0.005 | 761 | 500 |
| SbV (6%) | 0.004 | 867 | 500 |
| ScV (6%) | 0.004 | 1565 | 1500 |
| YV (6%) | 0.006 | 5270 | 4000 |
| AlSb (6%) | 0.0165 | 808 | 1000 |
| InSb (6%) | 0.0075 | 1172 | 1000 |
| ScSb (6%) | 0.03 | 1617 | 1000 |
| Ysb (6%) | 0.0065 | 1396 | 1000 |
| AlTa (6%) | 0.0035 | 514 | 1000 |
| GaTa (6%) | 0.005 | 948 | 1000 |
| InTa (6%) | 0.0205 | 821 | 1000 |
| YTa (6%) | 0.0055 | 1106 | 1000 |
| ScTa (10%) | 0.011 | 473 | 544 |
| YTa (10%) | 0.0075 | 701 | 544 |

BST64 = $Ba_{0.6}Sr_{0.4}TiO_3$

BSTMgO = 40 Wt% BST64 + 60 Wt% MgO

Fig. 27

FERROELECTRIC/PARAELECTRIC MATERIALS, AND PHASE SHIFTER DEVICES, TRUE TIME DELAY DEVICES AND THE LIKE CONTAINING SAME

BENEFIT CLAIM

This application claims the benefit of U.S. Provisional Application No. 60/332,540 filed Nov. 26, 2001, and U.S. Provisional Application No. 60/332,535 filed Nov. 26, 2001 each of which is incorporated by reference herein in its entirety.

STATEMENT OF GOVERNMENT INTEREST

The invention described herein may be manufactured, used and/or licensed by or for the United States Government without the payment of any royalties.

FIELD OF THE INVENTION

The present invention provides ferroelectric/paraelectric materials (FE/PE materials), which may be used in electric-field tunable devices, such as RF (radio-frequency), microwave and millimeter-wave tunable devices such as filters, phase shifter and true time delay applications, and filters, phase shifter and true time delay devices comprising the same. Specifically, the FE/PE materials provided are formed of the perovskite oxide $ABO_3$ structure by charge compensated atomic substitutions into the A-site or B-site or simultaneous substitutions into the A- and B-sites of the perovskite oxide $ABO_3$.

BACKGROUND OF THE INVENTION

Development of phase shifter and variable true time delay devices is of interest for beam steering of phase-array antennas at microwave frequencies. Phase shifter and variable true time delay technologies include, but are not limited to, those based on FE/PEs, laser diodes, MEMS, interferometry, pin diodes, and ferrites. The objects of these technologies are the reduction of cost, power consumption, weight, and size of devices, while maintaining or exceeding performance, frequency range and bandwidth of existing devices. Cost of device architecture and control circuitry, device bandwidth, material permittivity/permeability, loss factor, conductor losses, and impedance mismatch are all considerations that must be factored into the decision to choose materials and designs. However, all of the above technologies have disadvantages that must be overcome before affordable high performance broadband electronically scanned antenna systems may be realized.

In an effort to overcome the disadvantages of the above technologies, and to provide affordable high performance electronic beam steering of antennas at microwave frequencies, FE/PE materials derived from $Ba_{1-x}Sr_xTiO_3$ (BST) have been previously proposed and investigated. Such FE/PE phase shifters are based on the change in the effective electrical length of the device due to a change in the material permittivity induced by applying a dc electric field with field strength in the range 0.1 to 100 V/$\mu$m in the material. From a device design and operation point-of-view, physical parameters of interest are the real permittivity (hereinafter referred to as dielectric constant is $\epsilon$) of the material, tunability of the material, and microwave loss of the material as functions of both temperature and frequency. The ability to impedance match to the device is improved if the permittivity ($\epsilon$) of materials used is relatively low; however, high $\epsilon$ doesn't always dictate a decrease in phase shifter performance.

Large tunability is desirable for shortening the length of line needed to provide the identical phase shift for each fixed electric field strength in a phased-array antenna. Lower loss tangent materials can further reduce phase shifter losses in the RF, microwave and millimeter wave range if appropriate tunability can be maintained. Dielectric constant, tunability and loss tangent can all vary significantly with both frequency and temperature.

All three of the above parameters of a FE/PE material increase and peak as the Curie temperature, $T_c$, is approached. If the Curie transition is sharp, the material will have a limited temperature range for operation because the tunability rapidly approaches zero, as demonstrated in FIG. 2, for temperatures away from the Curie point. Below the Curie temperature, the FE/PE material again exhibits reduced tunability and losses can be unacceptably high. Thus, conventional FE/PE phase shifters are typically operated at $T>T_c$, where they are paraelectric (PE).

Therefore, it is an object of the present invention to provide a FE/PE material whose dielectric constant has a gradual peak, as shown in FIG. 2, at the Curie temperature, and is as low a dielectric constant as possible, in order to overcome the above deficiencies of previous FE/PE materials and to provide a more constant $\epsilon$, broader temperature range of operation and improved impedance match for the device. Other objects of the present invention include providing higher change in dielectric constant for a given change in magnitude of dc electric field applied to the material and, for some applications, higher rather than lower dielectric constant.

The effects of structure on the FE/PE transition have been previously analyzed for a variety of cation substitutions into $BaTiO_3$. It was found that covalency can influence lattice distortion, spontaneous polarization and $T_c$. In the previous work, $T_c$ was correlated with chemical bonds. The various parameters considered were size, charge, coordination number, electronic configuration of the cations, bond covalency, and cationic ordering. It has been suggested in those previous studies that $T_c$ may be a function of octahedral distortion; values might be adjustable with a minimal number of parameters compared to band structure analysis.

Several methods have been previously used for synthesizing FE/PE materials, such as producing perovskite oxide materials for use in microwave phase shifters. For example, composites comprising magnesia (MgO) and a solid solution of BST have been produced by making a simple weight percent addition of MgO to BST. However, temperature-dependent data of the low permittivity and tunability of the same indicate that such material may have limited use over the military specified temperature range of operation (−50° C. to 100° C.). In addition, two-phase composites may also complicate methods to effectively deposit thin films of the FE/PE material for devices, particularly if the MgO and perovskite are not compatible for simultaneous deposition or simultaneous adhesion with a substrate, or are not compatible with each other.

In addition to two-phase composites of MgO and perovskite, previous attempts have been made to dope perovskites with $Al_2O_3$ to increase tunability. Significant tunability increases have been observed. However, results were only obtained at room temperature using low doping on the order of 1% to obtain single-phase material, and it is believed that this material has a sharp Curie transition temperature and suffers from a limited temperature range of operation.

Compositions in which charge-compensated substitutions into the A and B site have been produced, referred to as acceptor-donor co-doped $BaTiO_3$, the focus of the producers thereof attempting to achieve high tunability and low dielectric loss tangents over a broad temperature range that includes the mil spec range. However, methods to achieve reduction of $\epsilon$ or constant $\epsilon$, and tunability versus temperature, were not investigated.

The effects upon $T_c$ of substitutions of Zr and of Sn for Ti in $BaTiO_3$ have been previously studied, and the development of new materials in which cation size and change affect how $T_c$ is shifted have been considered, but tunability of such systems has not been previously analyzed. The effects of structure on the FE/PE transition have been analyzed for a variety of cation substitutions into $BaTiO_3$, and it was found that covalency can influence lattice distortion, spontaneous polarization and $T_c$. Further, $T_c$ was correlated with chemical bonds. The various parameters considered were size, charge, coordination number, electronic configuration of the cations, bond covalency, and cationic ordering, and it was suggested that $T_c$ may be a function of octahedral distortion; values might be adjustable with a minimal number of parameters compared to band structure analysis.

While FE/PEs afford many advantages for electrical beam steering of antennas, one major disadvantage of current FE/PE phase shifters is the temperature sensitivity of phase shifter devices due to the sensitivity of permittivity (dielectric constant) to temperature variation. In order to control temperature variation, temperature-compensation circuits, ovens, cooling systems and the like are currently needed. Thus, it is an object of the present invention to provide a FE/PE material, for electric-field tunable devices such as phase shifter applications, having uniform permittivity and tunability throughout the temperature range of operation, i.e., a material that is relatively insensitive to temperature variation or equivalently having a small temperature coefficient of permittivity and tunability over the desired range of operating temperatures. Such a FE/PE material would simplify electric control circuitry so that temperature-compensation circuits or ovens can be eliminated, thus reducing overall cost and size of devices.

SUMMARY OF THE INVENTION

In order to achieve the objects of the present invention as described above, the present inventors provide herewith a FE/PE material for electric-field tunable devices, with emphasis for RF tunable, microwave, and millimeter devices such as phase shifter and true time delay applications, having uniform permittivity and tunability throughout the temperature range of operation, i.e., a material that is relatively insensitive to temperature variation or equivalently having a small temperature coefficient of permittivity and tunability over the desired range of operating temperatures. Such a FE/PE material simplifies electric control circuitry so that temperature-compensation circuits or ovens can be eliminated, thus reducing overall cost and size of devices, and enables production of both perovskite bulk and thin film FE/PE materials for use in a myriad of applications.

In a first embodiment of the present invention, ferroelectric/paraelectric materials are provided comprising pseudo-binary compounds defined by the phase diagram, as shown in FIG. 29. These pseudo-binary compounds comprise a solid solution of $BaIn_ySb_yTi_{1-2y}O_3$ with the cubic perovskite field of the solid solution $BaIn_ySb_yTi_{1-2y}O_3$ providing particularly useful electric field tunable material.

In a second embodiment of the present invention, ferroelectric/paraelectric materials are provided comprising pseudo-binary compounds defined by the phase diagram, as shown in FIG. 30. These pseudo-binary compounds comprise a solid solution of $BaSc_ySb_yTi_{1-2y}O_3$ with the cubic perovskite field of the solid solution $BaSc_ySb_yTi_{1-2y}O_3$ providing particularly useful electric field tunable materials.

In a third embodiment of the present invention, ferroelectric/paraelectric materials are provided comprising pseudo-ternary compounds defined by the phase diagram, as shown in FIG. 31. These psuedo-ternary compounds comprise a solid solution of $Ba_{1-x}Sr_xAl_yTa_yTi_{1-2y}O_3$ providing particularly useful electric field tunable materials.

In a fourth embodiment of the present invention, ferroelectric/paraelectric materials are provided comprising pseudo-ternary compounds defined by the phase diagram, as shown in FIG. 32. These pseudo-ternary compounds comprise a solid solution of $Ba_{1-x}Sr_xAl_ySb_yTi_{1-2y}O_3$ with the cubic perovskite field of the solid solution $Ba_{1-x}Sr_xAl_ySb_yTi_{1-2y}O_3$ providing particularly useful electric field tunable materials.

In a fifth embodiment of the present invention, ferroelectric/paraelectric materials are provided comprising pseudo-ternary compounds defined by the phase diagram, as shown in FIG. 33. These pseudo-ternary compounds comprise a solid solution of $Ba_{1-x}Sr_xGa_yTa_yTi_{1-2y}O_3$ with the cubic perovskite field of the solid solution $Ba_{1-x}Sr_xGa_yTa_yTi_{1-2y}O_3$ providing particularly useful electric field tunable materials.

In a sixth embodiment of the present invention, ferroelectric/paraelectric materials are provided comprising pseudo-ternary compounds defined by the phase diagram, as shown in FIG. 34. These pseudo-ternary compounds comprise a solid solution of $Ba_{1-x}Ca_xIn_ySb_yTi_{1-2y}O_3$ with the cubic perovskite field of the solid solution $Ba_{1-x}Ca_xIn_ySb_yTi_{1-2y}O_3$ providing particularly useful electric field tunable materials.

In a seventh embodiment of the present invention, ferroelectric/paraelectric materials are provided comprising pseudo-ternary compounds defined by the phase diagram, as shown in FIG. 35. These pseudo-ternary compounds comprise a solid solution of $Ba_{1-x}Sr_xSc_ySb_yTi_{1-2y}O_3$ with the cubic perovskite field of the solid solution $Ba_{1-x}Sr_xSc_ySb_yTi_{1-2y}O_3$ providing particularly useful electric field tunable materials.

In an eighth embodiment of the present invention, ferroelectric/paraelectric materials are provided comprising pseudo-ternary compounds defined by the phase diagram, as shown in FIG. 36. These pseudo-ternary compounds comprise a solid solution of $Ba_{1-x}Sr_xGa_ySb_yTi_{1-2y}O_3$ with the cubic perovskite field of the solid solution $Ba_{1-x}Sr_xGa_ySb_yTi_{1-2y}O_3$ providing particularly useful electric field tunable materials.

In a ninth embodiment of the present invention, ferroelectric/paraelectric materials are provided comprising pseudo-ternary compounds defined by the phase diagram, as shown in FIG. 37. These pseudo-ternary compounds comprise a solid solution of $Ba_{1-x}Ca_xGa_yTa_yTi_{1-2y}O_3$ with the cubic perovskite field of the solid solution $Ba_{1-x}Ca_xGa_yTa_yTi_{1-2y}O_3$ providing particularly useful electric field tunable materials.

In a tenth embodiment of the present invention, ferroelectric/paraelectric materials are provided comprising pseudo-ternary compounds defined by the phase diagram, as shown in FIG. 38. These pseudo-ternary compounds comprise a solid solution of $Ba_{1-x}Ca_xAl_ySb_yTi_{1-2y}O_3$ with the cubic perovskite field of the solid solution $Ba_{1-x}Ca_xAl_ySb_yTi_{1-2y}O_3$ providing particularly useful electric field tunable materials.

In an eleventh embodiment of the present invention, ferroelectric/paraelectric materials are provided comprising pseudo-ternary compounds defined by the phase diagram, as shown in FIG. 39. These pseudo-ternary compounds comprise a solid solution of $Ba_{1-x}Sr_xY_yTa_yTi_{1-2y}O_3$ with the cubic perovskite field of the solid solution $Ba_{1-x}Sr_xY_yTa_yTi_{1-2y}O_3$ providing particularly useful electric field tunable materials.

In a twelfth embodiment of the present invention, ferroelectric/paraelectric materials are provided comprising pseudo-ternary compounds defined by the phase diagram, as shown in FIG. 40. These pseudo-ternary compounds comprise a solid solution of $Ba_{1-x}Sr_xSc_yTa_yTi_{1-2y}O_3$ with the cubic perovskite field of the solid solution $Ba_{1-x}Sr_xSc_yTa_yTi_{1-2y}O_3$ providing particularly useful electric field tunable materials.

BRIEF DESCRIPTION OF THE DRAWINGS

FIG. 4 is a table, whose results illustrate the finding that updoped BST outperforms BST doped with MgO at a specific temperature (in this case room temperature).

FIG. 12 is a table illustrating the composition of the 3% and 5% substitution of charge compensating ion pairs for 6% and 10% of Ti in the samples synthesized according to the present invention.

FIG. 13(*b*) is a graph of percent tunability divided by electric field vs. temperature at 1 MHz for 3% substitutions of $X^{4+}$ with X=Xn, Ge, and Zr for 3% of Ti in the FE/PE material; that is, $Ba_{0.6}Sr_{0.4}X_{0.03}Ti_{0.97}O_3$, of the present invention.

FIG. 14(*a*) is a graph of dielectric constant vs. temperature at 1 MHz for 3% substitutions of the charge compensating pair, (X, V), with X=Y, Al, Ga, Sc, Sb, and In for 6% of Ti in the FE/PE material, that is, $Ba_{0.6}Sr_{0.4}X_{0.03}V_{0.03}Ti_{0.94}O_3$, of the present invention.

FIG. 14(*b*) is a graph of percent tunability divided by electric field vs. temperature at 1 MHz for 3% substitutions of the charge compensating pair, (X, V), with X=Y, Al, Ga, Sc, Sb, and In for 6% of Ti in the FE/PE material, that is, $Ba_{0.6}Sr_{0.4}X_{0.03}V_{0.03}Ti_{0.94}O_3$, of the present invention.

FIG. 15(*a*) is a graph of dielectric constant vs. temperature at 1 MHz for 3% substitutions of the charge compensating pair, (X, Sb), with X=Sc, Y, In, and Al for 6% of Ti in the FE/PE material, that is, $Ba_{0.6}Sr_{0.4}X_{0.03}Sb_{0.03}Ti_{0.94}O_3$, of the present invention.

FIG. 15(*b*) is a graph of percent tunability divided by electric field vs. temperature at 1 MHz for 3% substitutions of the charge compensating pair, (X, Sb), with X=Sc, Y, In, and Al for 6% of Ti in the FE/PE material, that is, $Ba_{0.6}Sr_{0.4}X_{0.03}Sb_{0.03}Ti_{0.94}O_3$ of the present invention.

FIG. 16(*a*) is a graph of dielectric constant vs. temperature at 1 MHz for 3% substitutions of the charge compensating pair, (X, Ta), with X=Ga, In, Al, and Y for 6% of Ti in the FE/PE material, that is, $Ba_{0.6}Sr_{0.4}X_{0.03}Ta_{0.03}Ti_{0.94}O_3$, of the present invention.

FIG. 16(*b*) is a graph of percent tunability divided by electric field vs. temperature at 1 MHz for 3% substitutions of the charge compensating pair, (X, Ta), with X=Ga, In, Al, and Y for 6% of Ti in the FE/PE material $Ba_{0.6}Sr_{0.4}X_{0.03}Ta_{0.03}Ti_{0.94}O_3$ of the present invention.

FIG. 17(*b*) is a graph of percent tunability divided by electric field vs. temperature at 1 MHz for 5% substitutions of the charge compensating pair, (Sc, Ta) and (Y, Ta), for 10% of Ti in the FE/PE material of the present invention.

FIG. 24 is a table of dielectric constants, tunabilities, temperature ranges, and critical temperature for various reference BST samples, as well as samples of FE/PE BST materials of the present invention which have a Ba/Sr ratio of 6/4.

FIG. 25 is a table of dielectric constants, tunabilities, temperature ranges, and critical temperature for various reference BST samples, as well as samples of FE/PE BST materials of the present invention which have a Ba/Sr ratio of 9/1, 8/2, 6/4 as indicated.

FIG. 26 is a table of figures of merit (FOM) for the samples shown in FIGS. 12–18 above.

FIG. 27 is a table of $\epsilon(E=0)$ and loss tangents at 1 kHz for the samples shown in FIG. 26 above.

DETAILED DESCRIPTION OF THE INVENTION

FE/PE materials may be used, but not limited to use, in electric-field tunable devices such as radio-frequency (RF), microwave, and millimeter wave phase shifters, true time delay devices, impedance transformers and tunable filters. The function of such FE/PE materials relies on the change in the effective electrical length of the device due to a change in the material permittivity (dielectric constant) induced by applying a dc electric field with field strength in the range of 0.1 to 100 V/$\mu$m in the FE/PE material.

From a device design and operation point-of-view, parameters affecting the function of such phase shifters are the real permittivity (from hereon also called dielectric constant, $\epsilon$), tunability, and microwave loss of the material as functions of both temperature and frequency. The ability to impedance match to the phase shifter device is improved if the permittivity of materials used is relatively low. However, high $\epsilon$ doesn't necessarily dictate a decrease in phase shifter performance.

Large tunability is desirable for shortening the length of line needed to provide the identical phase shift for each fixed electric field strength in a phased-array antenna, a common phase shifter device in which the materials of the present invention may be utilized. Lower loss tangent materials can further reduce phase shifter losses in the RF, microwave and millimeter wave range if appropriate tunability can be maintained. Dielectric constant, tunability and loss tangent can vary significantly with both frequency and temperature. Further, all three parameters of a FE/PE material increase and peak as the Curie temperature, $T_c$, is approached. If the Curie transition is sharp, the material will have an undesirably limited temperature range of operation, because the tunability rapidly approaches zero for temperatures away from the Curie point. Below the Curie temperature, in the FE regime, the material again exhibits reduced tunability and losses can be high. Thus, FE phase shifters are typically operated at $T>T_c$, where they are paraelectric (PE).

The present invention provides new FE/PE single-phase materials with dielectric constants and tunabilities that are relatively insensitive to temperature, and that can operate successfully and efficiently over the entire military specification temperature range of −50° C. to 100° C. This is achieved by the provision herein of an extended array of compounds with dilute charge-balanced substitutions into the Ti site (also referred to as the B site herein) of $Ba_{1-x}Sr_xTiO_3$.

Figure 1:
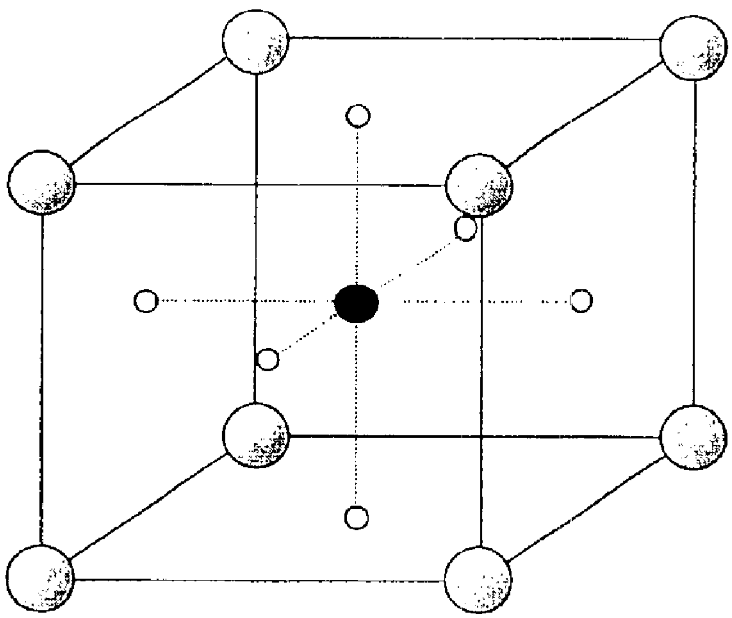
FIG. 1 is a perspective view of an $ABO_3$ perovskite structure of the present invention, wherein charge-compensating substitutions for Ti occupy the B (middle) site. Charge compensating substitutions may also be placed in the A (corner) site.

These FE/PE single-phase materials have primarily dilute charge-compensated substitutions, which are made into the Ti site, as shown in FIG. 1, of $Ba_{1-x}Sr_xTiO_3$ having the perovskite structure. Limiting the substitution into the Ti site provides for a lower, more constant dielectric constant (over a broad temperature range), provides a single-phase structure, primarily cubic structure and provides a FE/PE material very well suited for pulsed-laser thin-film deposition and other physical vapor deposition methods for fabrication of a device. Such FE/PE materials include but are not limited to materials with one-to-one substitution of $Sn^{4+}$, $Ge^{4+}$, or $Zr^{4+}$ for $Ti^{4+}$, $Ta^{5+}$ as the $Z^{5+}$ ion and $Sc^{3+}$ as the $X^{3+}$ ion, as well as materials with a suitable substitution of an acceptor and a donor oxidation state of 4−n and 4+n, respectively (n=1, 2 or 3) for two $Ti^{4+}$.

Previous investigations have been made concerning dilute additions of various elements into ferroelectric materials. However, such additions are not direct substitutions into the ferroelectric lattice, as herein, because they were not properly charge-compensated. That is, additions typically result in the formation of a second phase material. The physical properties, microstructure, Curie temperature, and electrical properties (including dielectric constant, tunability and loss tangent) of this second phase material can and typically do significantly differ from the properties of ferroelectric materials having direct charge-balanced substitutions into the lattice, such as the materials of the present invention.

Selecting materials having a cubic phase enhances control of crystallographic orientations in the deposition of thin films. Avoiding non-cubic phases in the many composition systems, phase diagrams, precludes the engineering complexity of dealing with a highly anisotropic dielectric constant, especially in the use of textured materials, single crystals and single crystal-like thin films for RF, microwave and millimeter-wave devices. However, for RF, microwave and millimeter-wave device applications, non-cubic materials are permissible and can be readily used when the "effective" dielectric constant appears isotropic with respect to the microwave radiation. "Effective" isotropic behavior of the dielectric constant simplifies device design and fabrication issues. Depending upon the application, there are procedures that may be used to help make the "effective" dielectric constant of anisotropic materials appear isotropic with respect to the microwave radiation for the device.

Figure 2:
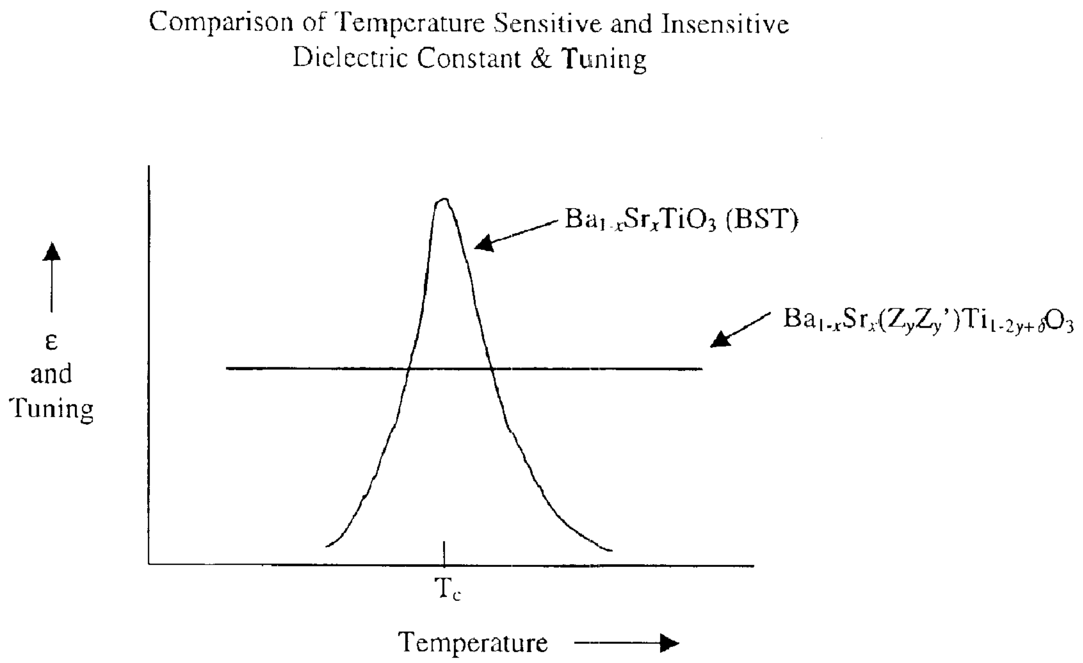
FIG. 2 is a graph illustrating change in dielectric constant and tunability vs. temperature for a conventional BST vs. the charged-compensated substituted BST of the present invention.

As shown in FIG. 2, BST with no substitution in the Ti site is shown to have a peak in dielectric constant and tunability at the Curie temperature, and a rapid decline in both characteristics as temperatures decrease or increase away from same. In contrast, BST with a charge-compensated substitution, as provided in the present invention, is shown to have a more constant dielectric constant and tunability throughout a broad range of temperatures.

For the single-ion isovalent substitutions for Ti, some broadening occurs in the FE transitions and tunabilities of Ge and Zr, i.e., $Ba_{0.6}Sr_{0.4}Ge_{0.03}Ti_{0.97}O_3$ and $Ba_{0.6}Sr_{0.4}Zr_{0.03}Ti_{0.97}O_3$, but maximum values of $\epsilon(E=0)$ are smaller but within a factor of two of that for $Ba_{0.6}Sr_{0.4}TiO_3$, and $T_c^{E=0}$ for these samples remains within a range of $-10°\ C. \leqq T_c^{E=0} \leqq 2°$ C. compared to 5° C. for $Ba_{0.6}Sr_{0.4}TiO_3$.

Specific embodiments of the present invention include $Ba_{0.6}Sr_{0.4}Al_{0.03}V_{0.03}Ti_{0.94}O_3$ and $Ba_{0.6}Sr_{0.4}Y_{0.03}Ti_{0.94}O_3$ as FE/PE materials for which $T_c^{E=0}$~−10° C., the dielectric constant at zero electric field, $\epsilon(0)$, is increased by a factor of five, and the maximum of the ratio of the tunability to the constant electric field is increased by more than 1.5 relative to the respective values for a similarly prepared $Ba_{0.6}Sr_{0.4}TiO_3$ sample. Such materials have, compared to the unsubstituted $Ba_{0.6}Sr_{0.4}TiO_3$, a broadened FE transition, a $T_c$ which is shifted to a lower temperature, and an increased range of temperatures over which tunability is observed.

A further preferred embodiment of the present invention provides a FE/PE material comprising $Ba_{0.6}Sr_{0.4}Y_{0.05}Ta_{0.05}Ti_{0.90}O_3$, which is highly tunable, has a low $\epsilon$, and a low variation in $\epsilon$ over the entire military specification range of temperature (−50° C. to 100° C.). At 1 MHz sampling frequency, the ratio of the tunability to the constant electric field, the dielectric constant at zero field, and a figure of merit computed from the ratio of the change in $\epsilon$ due to field over the change due to temperature variation have ranges of 2–14%-$\mu$m-$V^{-1}$, 350–850, and 2.5–17.5° C.-$\mu$m-$V^{-1}$, respectively, over the military specification range of temperatures.

The room temperature microwave properties are found to be competitive with those of a $Ba_{0.6}Sr_{0.4}TiO_3$/MgO composite with a 2/3-weight-% ratio of MgO. The $Ba_{0.6}Sr_{0.4}Y_{0.05}Ta_{0.05}Ti_{0.90}O_3$ is PE over the entire military specification range, whereas $T_c$ (below which losses are expected to be high) lies within the military specification temperature range for the composite.

Furthermore, a significant advantage of the materials of the present invention here over composites with low $\epsilon(0)$ is their single-phase structure, making them better suited for pulsed-laser thin-film deposition. Such thin-film deposition enables production of very small, lightweight devices, which are now preferred in the field. In general, the dilute substitutions prepared by the present inventors have a strong effect on the temperature dependence (temperature coefficient of $\epsilon$) of the dielectric properties in the materials with binary substitutions and combinations of these binary substitutions. It is believed that possible mechanisms for this effect could involve changes in the ordering of charge states or in the symmetries of charge configurations that could affect the local electric fields and polarization in the material.

Figure 3:
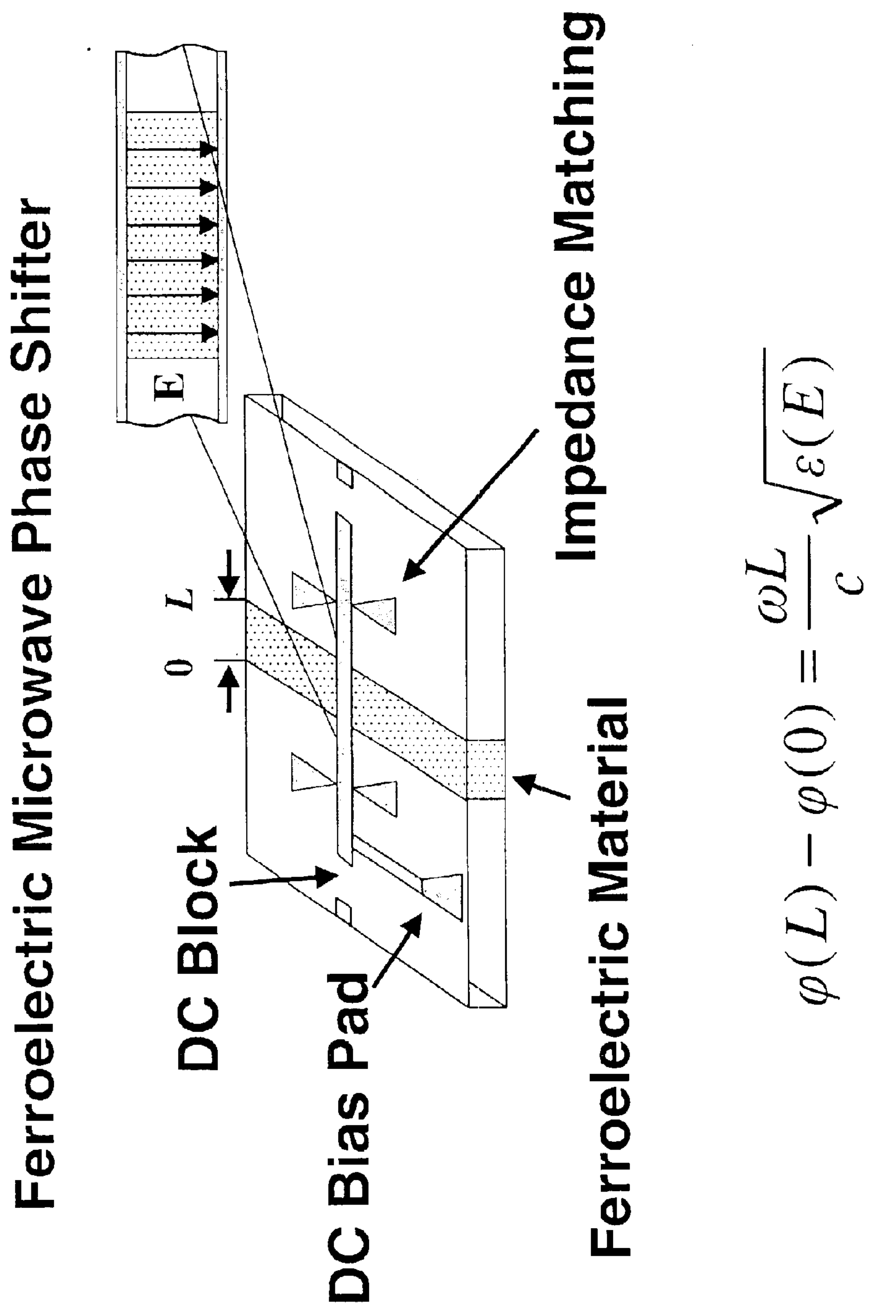
FIG. 3 is a perspective view of a FE/PE microwave phase shifter device, incorporating the FE/PE material of the present invention therein.

The FE/PE materials of the present invention may be utilized in phase shifter, true time delay devices, tunable filters, impedance transformers and other tunable RF devices. An example of same, a FE/PE microwave phase shifter according to the present invention, is shown in FIG. 3 herein, wherein the FE/PE material of the present invention is imbedded within a DC block. The DC block additionally has a bias pad as a coating thereon, that is in contact with the FE/PE material. Impedance matching is additionally provided.

In another example of a FE/PE phase shifter device, FIG. 4 illustrates the characteristics of a 10 GHz phase shifter using a microstrip design with a 0.003 inches thick BST/MgO composite material, a 0.003 inches wide 1 oz. copper line and a bias condition of 2 V/$\mu$m. Two such devices, one doped and one undoped, were theoretically modeled, the results of these tests being shown in FIG. 4 herein. The results of these tests demonstrate that undoped, BST-FE material outperforms BST-FE material doped with MgO at room temperature. However, BST doped with MgO will outperform undoped BST over the military specification temperature range due to the broadened transition. Thus, it was discovered by the present inventors that doping of the BST with certain elements broadens the transition, an important characteristic in real life applications.

PREPARATION EXAMPLES

Charge-balanced compounds with the generalized formulas, $Ba_{0.6}Sr_{0.4}X_y^{3+}Z_y^{5+}Ti_{1-2y}O_3$ and $Ba_{0.6}Sr_{0.4}X_y^{4+}Ti_{1-y}O_3$, were synthesized along with a control sample of $Ba_{0.6}Sr_{0.4}TiO_3$ (BST64). $X^{3+}$, $Z^{5+}$,and $X^{4+}$ refer to the ions of the elements that are substituting for Ti. Goldschmidt's tolerance factor and the Clausius-Mossotti relation were used as guides in choosing substitution ions. Appropriate carbonates or oxides of the constituent elements, 99.9% pure or better, were combined by weight percent to obtain the proper charge compensation and stiochiometric contents, then mixed, ground, pressed (5 kPSI), and calcined at 1100° C. for over 8 hours. Samples were reground and then isostatically pressed at 50 kPSI followed by sintering between 1350° C. and 1550° C. for 22–70 h.

Density data shows ~80–95% was the typical range of volume densities, and helium prcnometer measurements determined that the structural density is 97–99%. The compositions of the various samples prepared as described above are shown in Table II, FIG. 12 herein, with the 3 and 6 atomic % substitutions for Ti grouped into one and three sets, respectively. The control sample and the single-ion isovalent substitutions for $Ti^{4+}$ are in one set and the samples with the same Z atom (V, Sb, or Ta) in the other three sets. There are two samples with 10 atomic % substitution for Ti, one using $Sc^{3+}$ and $Ta^{5+}$ and the other using $Y^{3+}$ and $Ta^{5+}$. An additional sample of 40 weight % BST64 and 60 weight % MgO (BSTMgO) was obtained, which was prepared according to the procedures outlined in *Integrated Ferroelectrics,* J. Synowczynski, L. C. Sengupta and L. H. Chiu, 22, 861 (1998).

Figure 5:
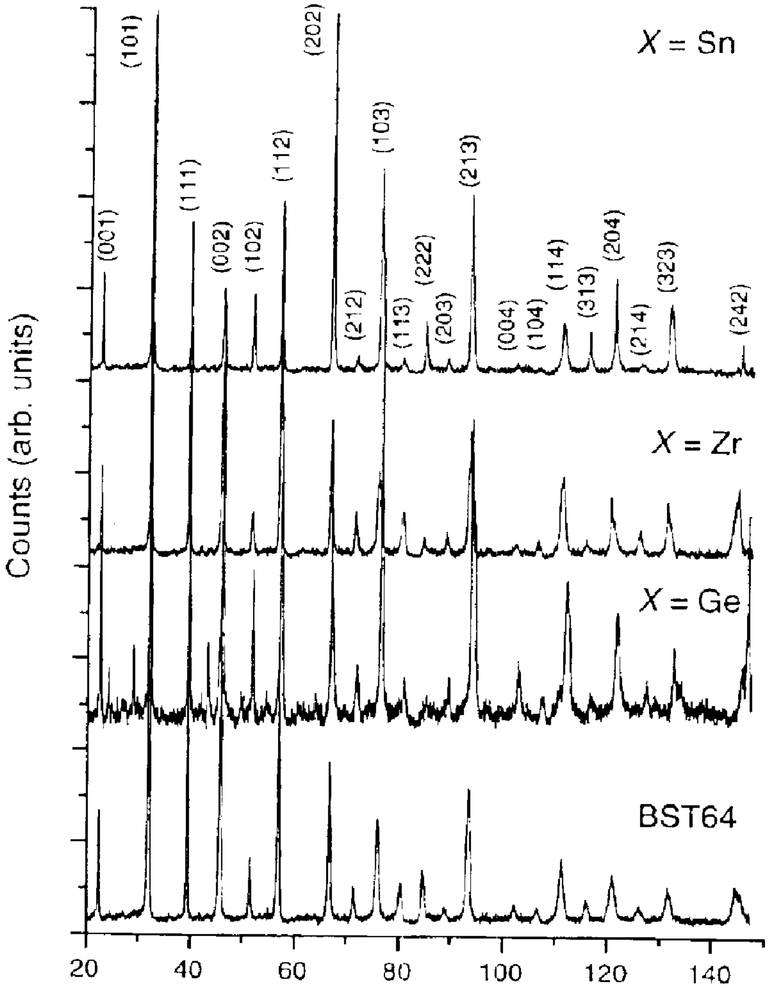
FIG. 5 is an X-ray diffraction pattern of 2θ scans for 3% substitutions of $X^{4+}$ for 3% of Ti in the FE/PE material of the present invention.
Figure 6:
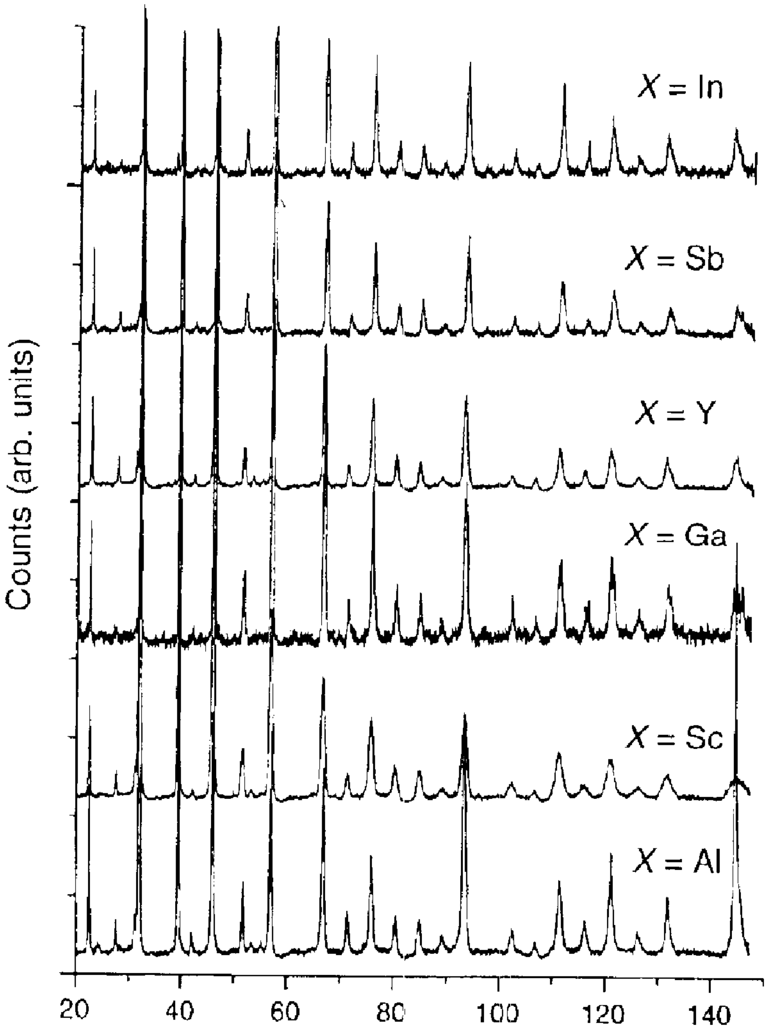
FIG. 6 is an X-ray diffraction pattern of 2θ scans for 3% substitutions of the charge compensating pair, (X, V), for 6% of Ti in the FE/PE material of the present invention.
Figure 7:
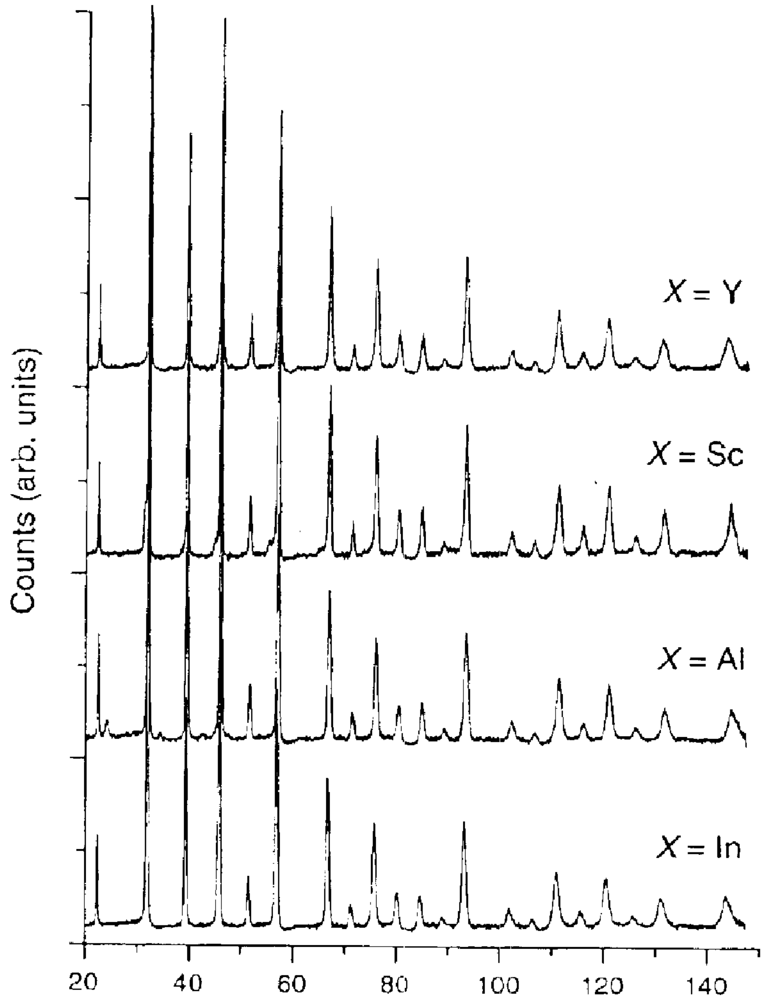
FIG. 7 is an X-ray diffraction pattern of 2θ scans for 3% substitutions of the charge compensating pair, (X, Sb), for 6% of Ti in the FE/PE material of the present invention.
Figure 8:
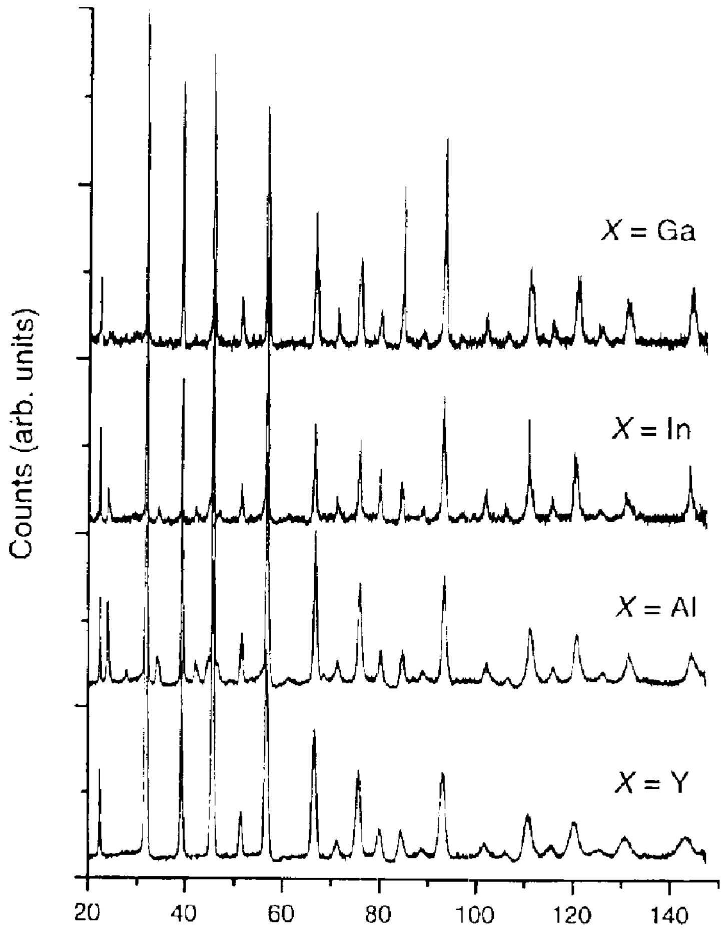
FIG. 8 is an X-ray diffraction pattern of 2θ scans for 3% substitutions of the charge compensating pair, (X, Ta), for 6% of Ti in the FE/PE material of the present invention.
Figure 9:
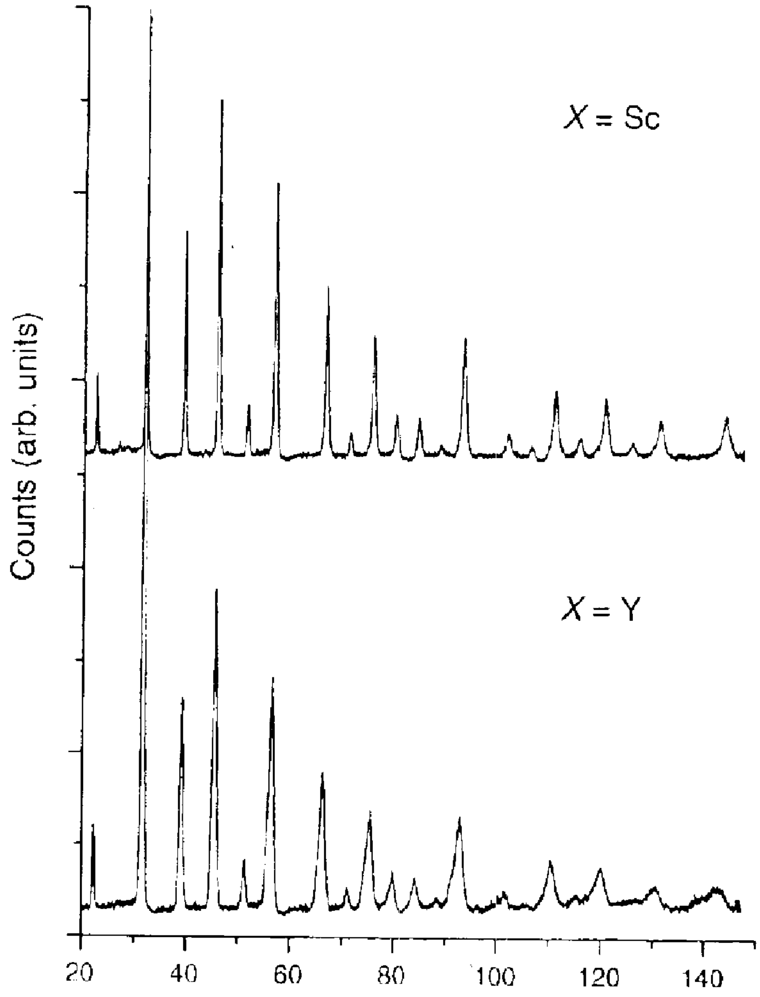
FIG. 9 is an X-ray diffraction pattern of 2θ scans for 5% substitutions of the charge compensating pair, (X, Ta), for 10% of Ti in the FE/PE material of the present invention.

X-ray diffraction θ–2θ scans are shown in FIGS. 5–9 herein for the 3 and 6% substitutions described above. The Miller indices (hk1) are labeled at the top of FIG. 5 and the spectrum for BST64 is shown at the bottom of FIG. 5. The spectra of FIGS. 5–9 demonstrate that a cubic single-phase material was obtained for all of the preparations. Additional smaller peaks were found at some of the approximate 2θ values of 24°, 28°, 35°, 42°, 45°, 46°, 50°, 53.5°, 55°, and 61°. This occurred for samples containing Ge, (In, V), (Sb, V), (Y, V), (Ga, V), (Sc, V), (Al, V), (Al, Sb), (In, Ta), and (Al, Ta). These are consistent with (hk1) values (012), (112), (003), (213), (104), (313), (323), and (333), respectively, for a cubic superlattice with an effective lattice constant which is double that of the unit cell. The lattice constants were derived from the x-ray diffraction peaks using the method of Cullity. Goldschmidt's tolerance factor and the Clausius-Mossotti relationships can be used as a guide for appropriate substitutions and combinations thereof.

Figure 10:
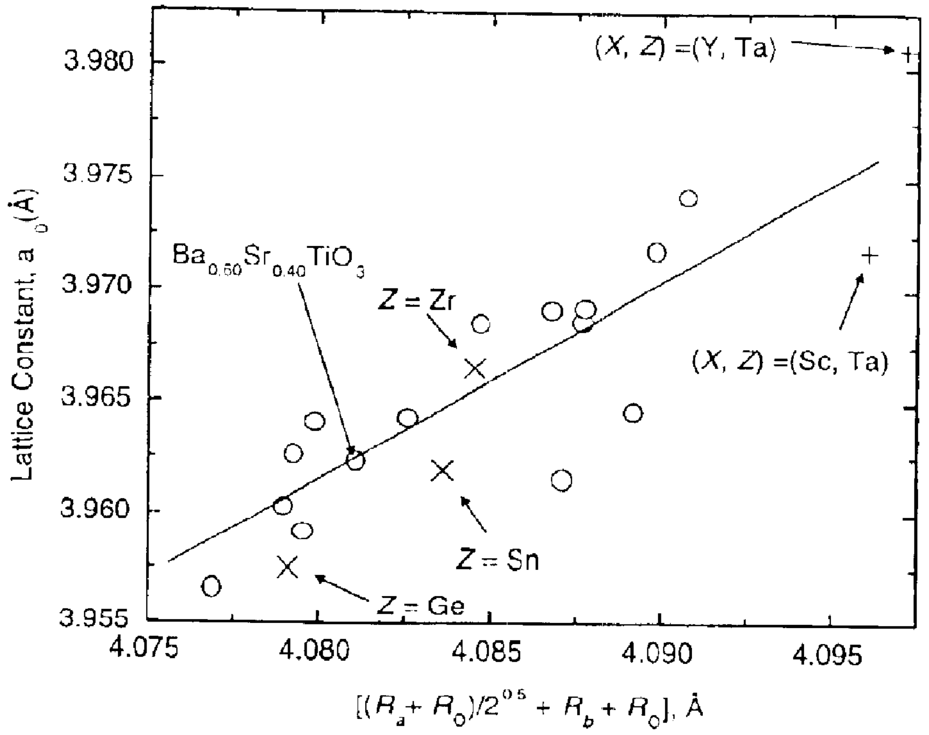
FIG. 10 is a graph of lattice constants, $a_0$, derived from experimental x-ray diffraction vs. lattice parameter, $a_G$, based on ionic radii of the A, B, and Oxygen (O) atoms in the unit cell, for a series of 3 FE/PE families of materials of the present invention. Undoped $Ba_{0.6}Sr_{0.4}TiO_3$ is shown for comparison.
Figure 11:
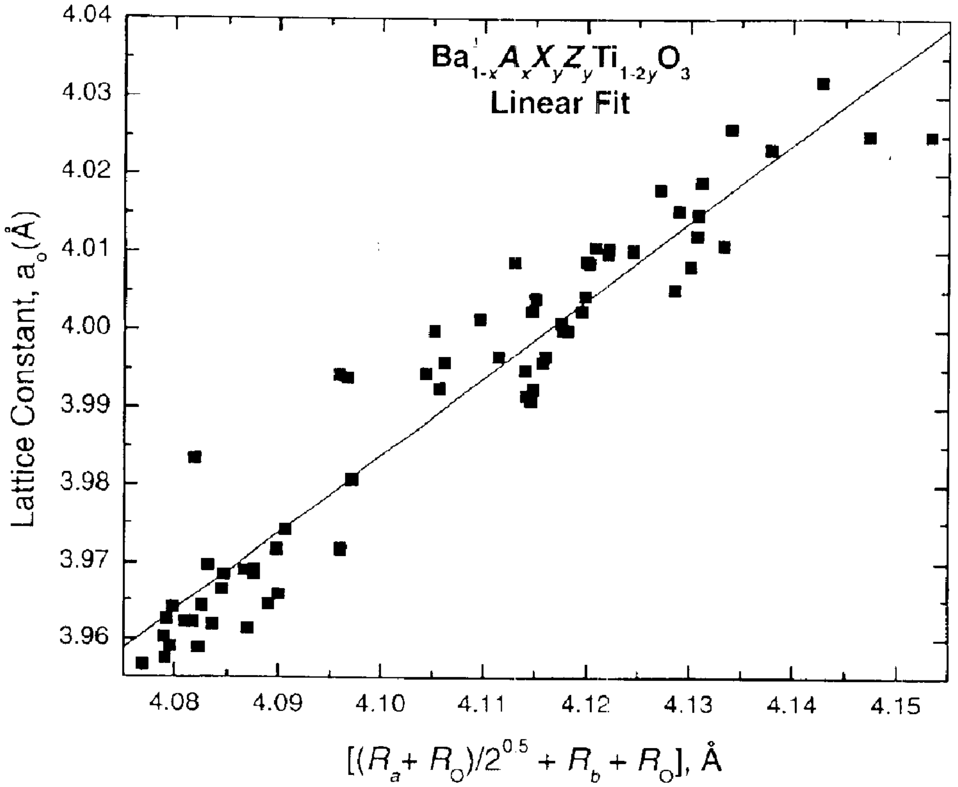
FIG. 11 is a graph of lattice constants, $a_0$, derived from experimental x-ray diffraction vs. lattice parameter, $a_G$, based on ionic radii of the A, B, and Oxygen (O) atoms in the unit cell, for a series of 3 FE/PE families of materials of the present invention $Ba_1\text{-}(x+p)Sr_xCa_pTi_{1-2y+\Delta}(Z_yZ'_y)O_3$ wherein x has values ranging from 0.01 to 0.15, p has values ranging from 0.05 to 0.10, y has values ranging from 0.1 to 0.15 and Z=Al, Ga, Sc, In, Y, Pr, Nd, Sm, Eu, Gd, Tb, Dy, Ho, Er, Tm, Yb, Lu, Zn, Mg, Ca and Z'=Sb, Ta, W, Mo, Nb versus an undoped BST (shown as $a_0$ in FIG. 10).

FIG. 10 herein is a plot of the experimental lattice constants, obtained from the x-ray data, versus a lattice parameter, $a_G$, where $a_G$ is represented by the following equation:

$$a_G=(R_a+R_O)/2^{1/2}+R_b+R_O \tag{I}$$

which is derived from a hard-sphere model for the perovskite unit cell of Goldschmidt. $R_a$ is the radius of the A-site atom, $R_b$ is the radius of the B-site atom, and $R_O$ is the radius of the oxygen atom. To compute $a_G$, ionic radii from *Acta Crystallogr. A,* Shannon, R. D. 32, 751(1971) were used, and $R_a$ and $R_b$ were weighted to account for the stoichiometric percentages of ions present in each site for the various compounds synthesized. The plotted line shown in FIG. 10 is the least squares linear fit of the data.

CAPACITANCE AND MICROWAVE CAVITY MEASUREMENTS

After preparation and characterization of the samples shown in Table II, as shown in FIG. 12, and described above, measurements of properties relevant for evaluation of phase shifter, true time delay applications and other tunable RF, microwave, and millimeter wave device applications ($\epsilon$, tunability, and loss tangent) were made, and values for each obtained, as follows:

A measurement of dielectric constant versus temperature and versus electric field was made for each of the samples. The electric field needed for such measurement was provided by application of a voltage from a Bertan 205B high voltage D. C. power supply across the capacitor-plate contacts. A Boonton 72BD capacitance meter, with 1 MHz sampling frequency and adjusted so that the measurement circuit was isolated from the power supply ground, was used to make capacitance measurements.

Temperature-dependent measurements were made in the range of −75° C.≦T≦100° C. with temperature control within ±0.1° C. provided by a Tenney Junior Environmental Chamber. Background capacitance effects versus temperature for each of the samples discussed above were estimated by measuring the capacitance of the empty text fixture (no sample mounted in it). This measured capacitance of the empty test fixture was then subtracted from the capacitance values measured for each of the samples studied.

A room-temperature measurement was made of the capacitance and loss tangent of each sample at 1 kHz using a BK 878 Universal LCR meter. Measurements of $\epsilon$ and loss tangent at 20 GHz were performed using a microwave confocal resonator on a sample of $Ba_{0.6}Sr_{0.4}Y_{0.05}Ta_{0.05}Ti_{0.90}O_3$ whose thickness was 483 $\mu$m (less than the wavelength of radiation in the sample at the maximum-measured frequency of 30 GHz) and whose diameter exceeds the beam waist at the cavity center. Results were determined, according to methods described in *Proc. R. Soc. Lond.,* A. L. Cullin and P. K. Yu, 325, 493 (1971), and improvements in instrumentation by some of the present inventors, by comparing the frequency and the broadening of resonances for the sample in the cavity to those for the case in which the cavity is empty.

RESULTS

Figures 13A, 13B:
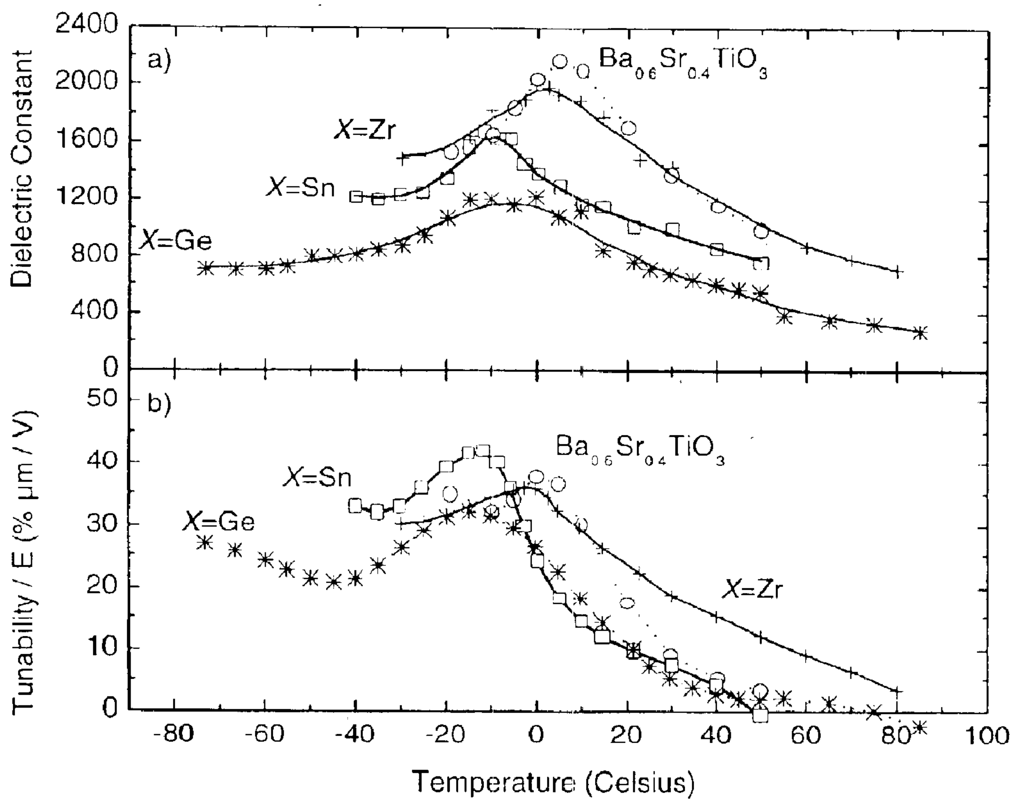
FIG. 13(*a*) is a graph of dielectric constant vs. temperature at 1 MHz for 3% substitutions of $X^{4+}$ with X=Sn, Ge, and Zr for 3% of Ti in the FE/PE material, that is, $Ba_{0.6}Sr_{0.4}X_{0.03}Ti_{0.97}O_3$, of the present invention.
Figures 17A, 17B:
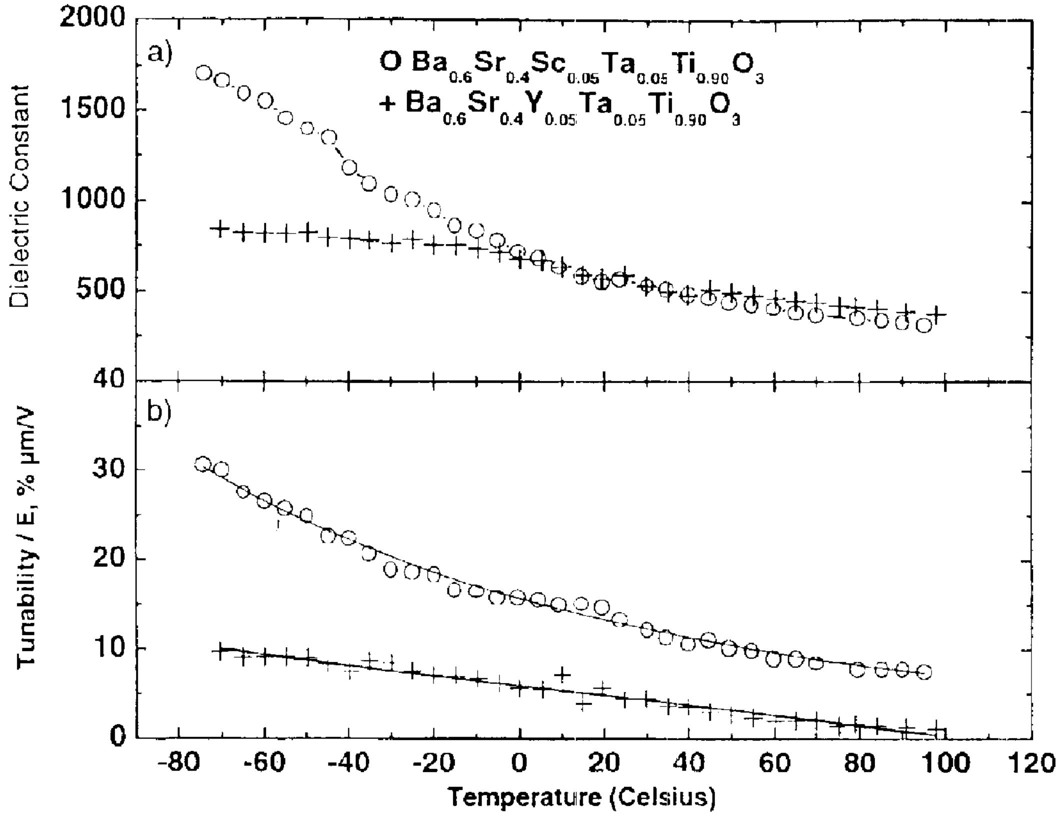
FIG. 17(*a*) is a graph of dielectric constant vs. temperature at 1 MHz for 5% substitutions of the charge compensating pair, (Sc, Ta) and (Y, Ta), for 10% of Ti in the FE/PE material of the present invention.
Figure 18:
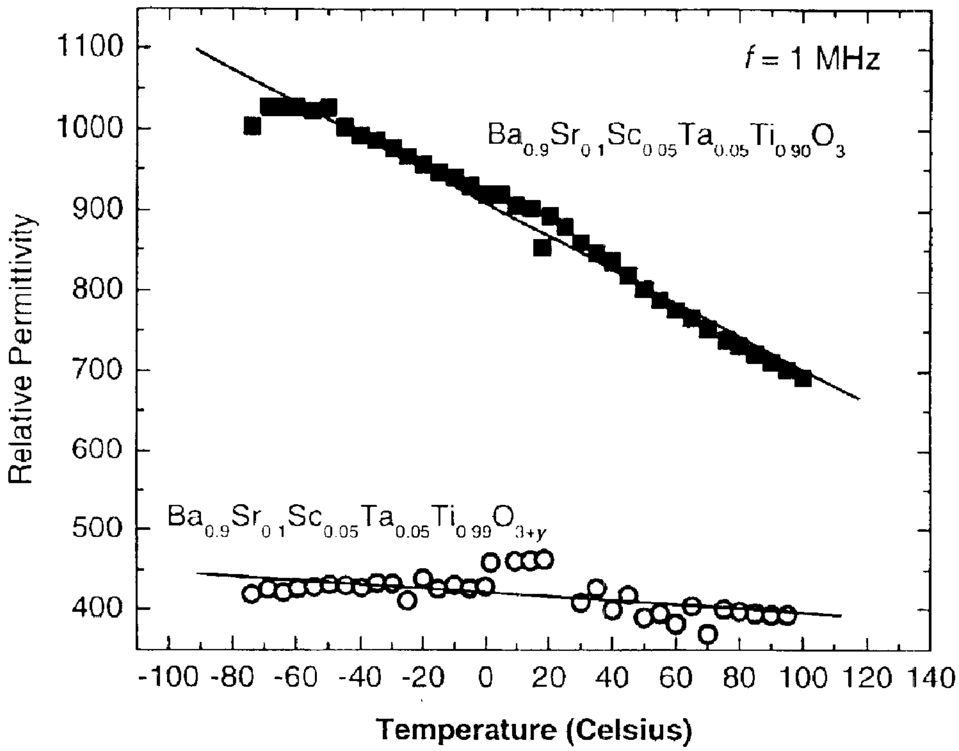
FIG. 18 is a graph of dielectric constant vs. temperature at 1 MHz for $Ba_{0.09}Sr_{0.1}Sc_{0.05}Ta_{0.05}Ti_{0.9}O_3$ and $Ba_{0.9}Sr_{0.1}Sc_{0.05}Ta_{0.05}Ti_{0.99}O_{3+\delta}$ (the same composition with 9% excess of Ti where δ represents excess oxygen for charge compensating the excess Ti), as called for in the FE/PE material of the present invention.
Figure 19:
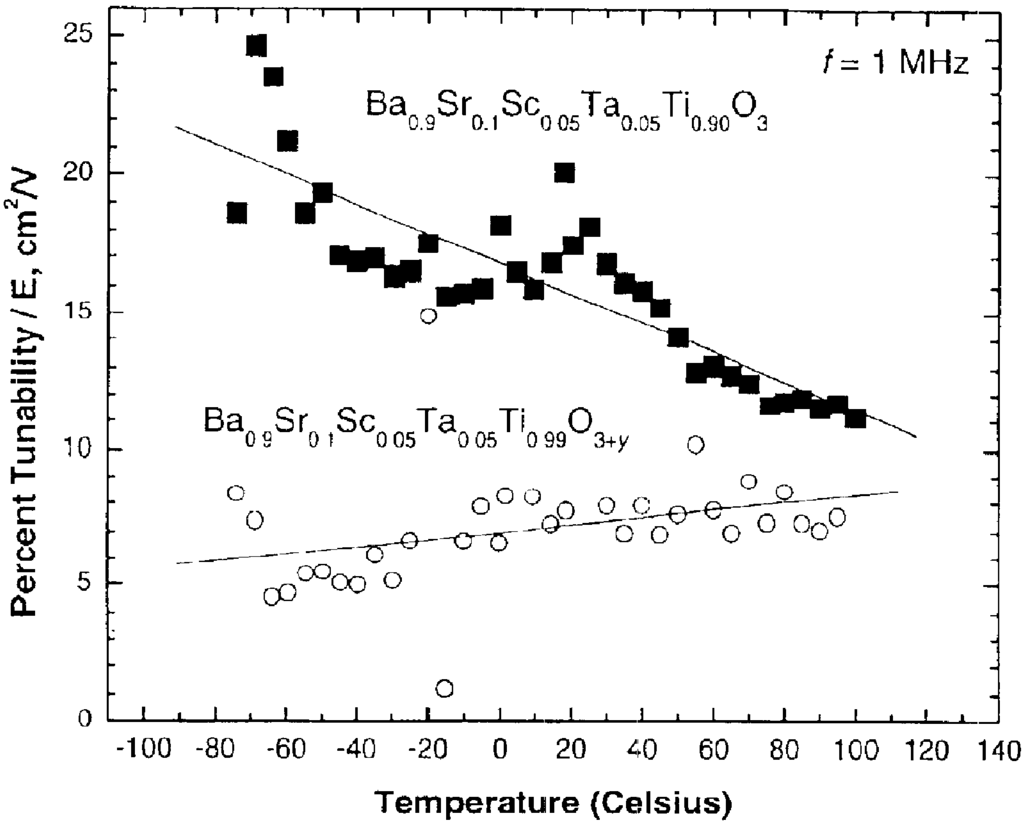
FIG. 19 is a graph of percent tunability divided by electric field vs. temperature at 1 MHz for $Ba_{0.9}Sr_{0.1}Sc_{0.05}Ta_{0.05}Ti_{0.9}O_3$ and $Ba_{0.9}Sr_{0.1}Sc_{0.05}Ta_{0.05}Ti_{0.99}O_{3+\delta}$ (the same composition with 9% excess of Ti where δ represents excess oxygen for charge compensating the excess Ti), as called for in the FE/PE material of the present invention.
Figure 20:
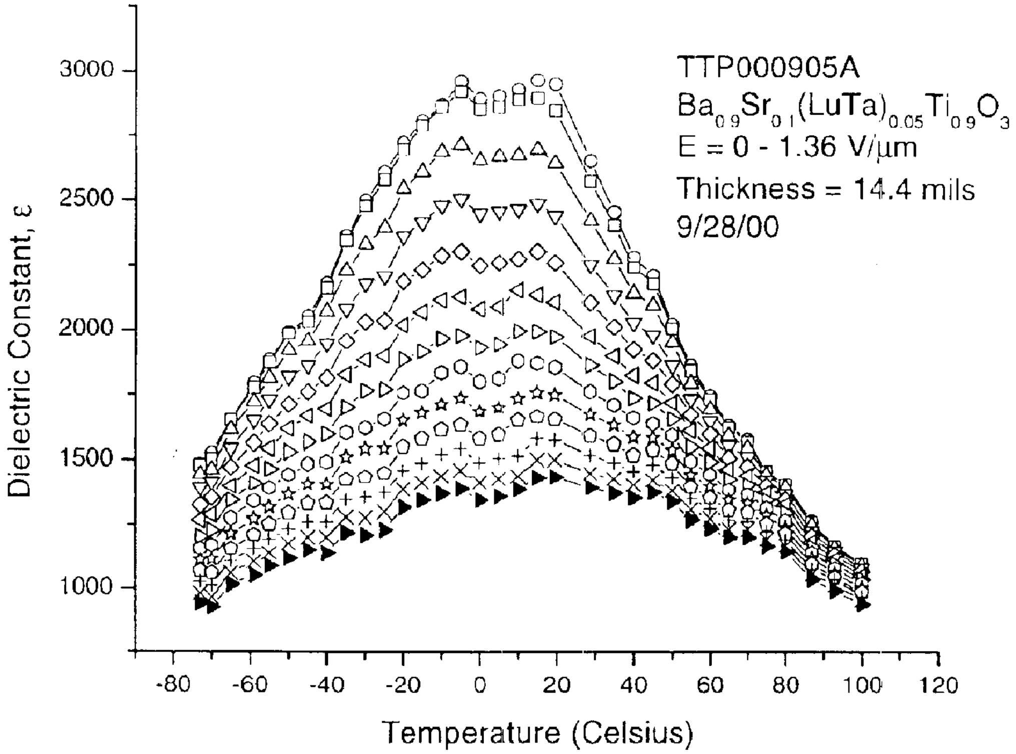
FIG. 20 is a graph of dielectric constant vs. temperature at 1 MHz for $Ba_{0.9}Sr_{0.1}Lu_{0.05}Ta_{0.05}Ti_{0.9}O_3$, a FE/PE material of the present invention. The plots are at different electric fields, E; the parameter varied is voltage in 50 volt increments from 0 to 600 volts.
Figure 21:
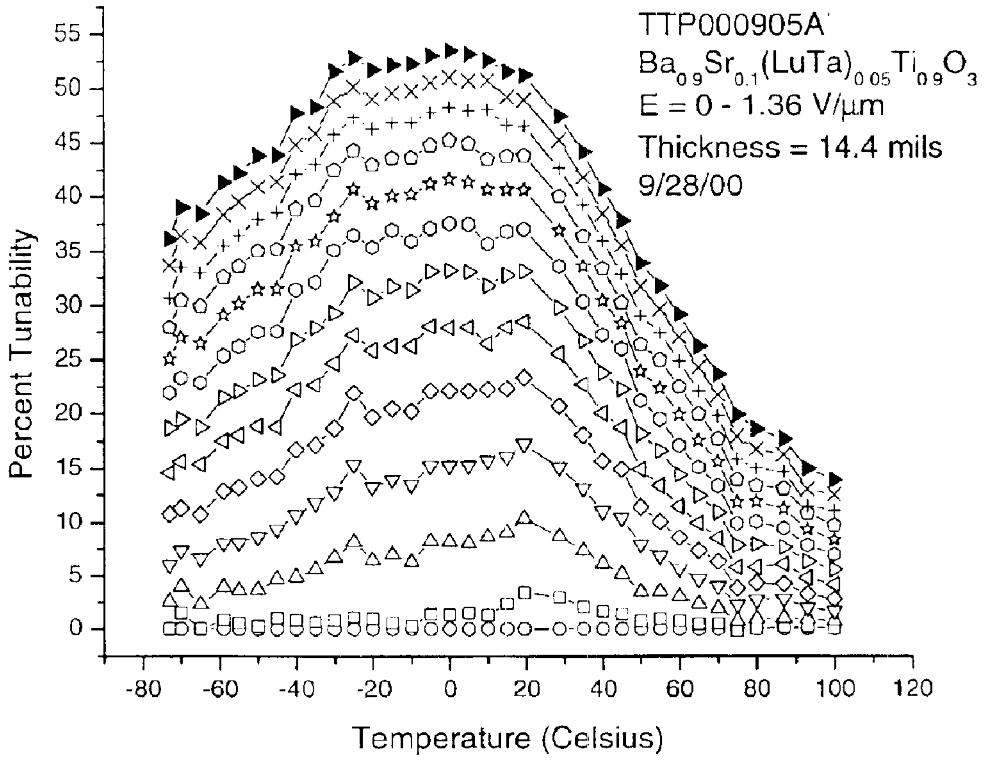
FIG. 21 is a graph of percent tunability vs. temperature at 1 MHz for $Ba_{0.9}Sr_{0.1}Lu_{0.05}Ta_{0.05}Ti_{0.9}O_3$, a FE/PE material of the present invention. The plots are at different electric fields, E; the parameter varied is voltage in 50 volt increments from 0 to 600 volts.
Figure 22:
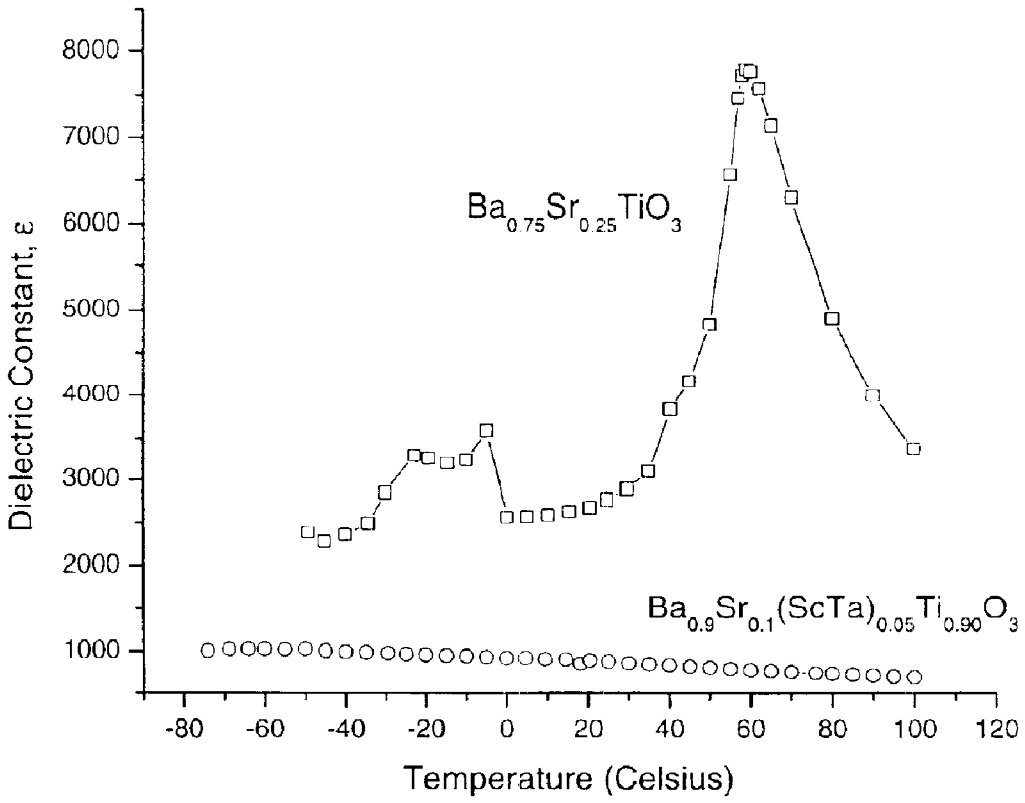
FIG. 22 is a graph of dielectric constant vs. temperature at 1 MHz and electric field E=0, for $Ba_{0.75}Sr_{0.25}TiO_3$ and $Ba_{0.9}Sr_{0.1}Sc_{0.05}Ta_{0.05}Ti_{0.9}O_3$, with the latter being a FE/PE material of the present invention. The parameter is voltage in 50 volt increments from 0 to 600 volts. Other substitutions are possible and combinations thereof are also possible.
Figure 23:
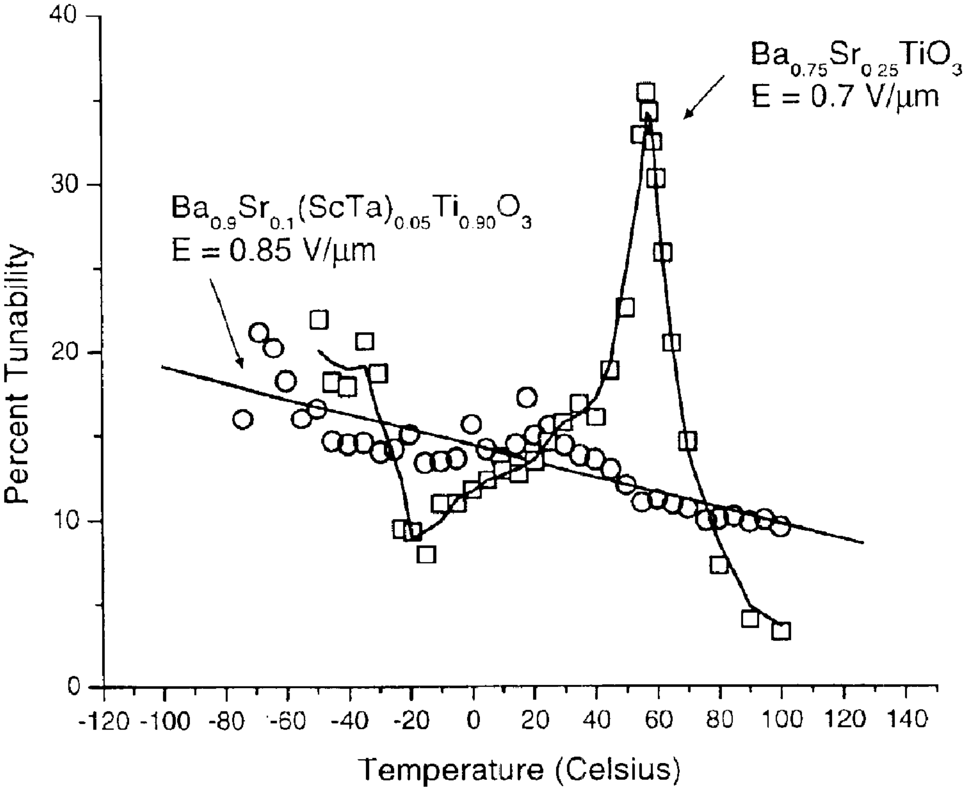
FIG. 23 is a graph of percent tunability vs. temperature at 1 MHz for $Ba_{0.75}Sr_{0.25}TiO_3$, and $Ba_{0.9}Sr_{0.1}Sc_{0.05}Ta_{0.05}Ti_{0.9}O_3$ the latter being a FE/PE material of the present invention. Other substitutions are possible and combinations thereof are also possible.

FIGS. 13(*a*)–16(*a*) herein show the zero-field dielectric constant, ε(0), and in FIGS. 13(*b*)–16(*b*), the percent tunability normalized by dividing by the electric field, {100Δε/ε(0)/E≡% Tun/E}, for 3 and 6% substitutions into the Ti site. Since ε(E) was linear, values of % Tun/E obtained here can be compared with those of other similarly linear materials. FIGS. 17(*a*) and 17(*b*) show ε(0) and % Tun/E, respectively, versus temperature for the 5% substitutions of the charge compensating pairs (Sc, Ta) and (Y, Ta) for 10% of Ti($Ba_{0.6}Sr_{0.4}Sc_{0.05}Ta_{0.05}Ti_{0.90}O_3$ and $Ba_{0.6}Sr_{0.4}Y_{0.05}Ta_{0.05}Ti_{0.90}O_3$).

Table III, as shown in FIG. 24, shows the range of ε(0), range of % Tun/E, and the FE transition temperature for zero field ($T_c^{E=0}$) for measurements on all the samples in the corresponding temperature ranges $T_{min}≦T≦T_{max}$. Together, these results show how the behavior of each material compares with that of others in the military specification temperature range of from −50° C. to 100° C. For example, the $Sn^{4+}$ substitution for Ti alters $T_c$ very little. However, the FE/PE transition is broadened for Zr and Ge substitutions, which is preferred. The properties of ($Ba_{0.9}Sr_{0.1}Sc_{0.05}Ta_{0.05}Ti_{0.90}O_3$ and $Ba_{0.9}Sr_{0.1}Y_{0.05}Ta_{0.05}Ti_{0.90}O_3$) and other such materials, with Ba/Sr ratio 9/1, have an expanded range of operating temperatures compared with Ba/Sr ratio 6/4.

Maxima in ε(0) are smaller but within a factor of two of that for BST64 and $T_c$ for these samples remains within a range of −10° C.≦$T_c^{E=0}$≦2° C. compared to 5° C. for BST64. In contrast, for all of the (X, Z) binary substitutions except (Al, V) and (Y, V), there is considerably more broadening in ε(0) and % Tun/E, and $T_c^{E=0}$ is shifted to −40° C. or lower.

For $Ba_{0.6}Sr_{0.4}Sc_{0.05}Ta_{0.05}Ti_{0.90}O_3$ and $Ba_{0.6}Sr_{0.4}Y_{0.05}Ta_{0.05}Ti_{0.90}O_3$, FIG. 17(*a*) shows that the $T_c$ lies below the military specification temperature range and a low ε(0) has been obtained. With regards to ε(0) and % Tun/E, as shown in FIGS. 17(*a*) and 17(*b*), respectively, these factors are more temperature dependent for $Ba_{0.6}Sr_{0.4}Sc_{0.05}Ta_{0.05}Ti_{0.90}O_3$. In contrast, for $Ba_{0.6}Sr_{0.4}Y_{0.05}Ta_{0.05}Ti_{0.90})_3$, ε(0) and % Tun/E are more nearly temperature independent. As mentioned above, this is a desirable property for phase shifter device applications especially when tunability can be maintained.

The maximum and minimum of ε(0) for the 5% substitution of the charge compensating pair (Y, Ta) for 10% of Ti in the material are about a factor of four larger than those of BSTMgO. Their tunabilities are comparable. The 5% substitution (Y, Ta) has a negative slope in ε versus T over the entire military specification range, which is characteristic of paraelectric behavior. However, the BSTMgO sample has a ferroelectric transition temperature at −30° C., below which the material is ferroelectric. Device performance is likely decreased below $T_c$.

The dilute charge substitutions discussed above, using acceptor-donor pairs substituting solely on the B-site (Ti-site) in $BaTiO_3$, have enabled significant lowering of the useful temperature regime of operation below that for $BaTiO_3$, and below the $T_c$ of BST64. Substitution of Sr for Ba in BST without any substitutions for Ti shifts the $T_c$ of $BaTiO_3$, but maintains a sharp transition and does not change the temperature range over which the material is useful. The charge compensating ion pair substitutions into the B-site lower the $T_c$ even further, and broaden the transition so that the material can be used in the paraelectric state, with reduced ε over most or all of the military specification temperature range while maintaining tunability at 100° C. Such charge compensating ion pair substitutions can also be made into the A-site of the perovskite unit cell.

In addition to the materials with low ε and temperature independent high tunability, there are materials for which high ε and/or high tunability over at least part of the military specification range have been obtained, that may prove useful for other electronic applications. These include $Ba_{0.6}Sr_{0.4}Y_{0.03}V_{0.03}Ti_{0.94}O_3$ and $Ba_{0.6}Sr_{0.4}Al_{0.03}V_{0.03}Ti_{0.94}O_3$, which have maximum values of ε(0) between 8,000 and 11,000 at 1 MHz and % Tun/E between 64%-μm-$V^{-1}$ and 70%-μm-$V^{-1}$, and the samples $Ba_{0.6}Sr_{0.4}X_{0.03}Z_{0.03}Ti_{0.94}O_3$ with (X, Z)=(Y, Ta), (In, Ta), (In, Sb), (Ga, Ta), (Ga, V), and (Sc, Sb), whose maxima in ε(0) are an order of magnitude lower than those of $Ba_{0.6}Sr_{0.4}Y_{0.03}V_{0.03}Ti_{0.94}O_3$, and $Ba_{0.6}Sr_{0.4}Al_{0.03}V_{0.03}$Ti0.94$O_3$ but which still exhibit maxima in % Tun/E which exceed 20%-μm-$V^{-1}$. The FE transition, $T_c^{E=0}$, for samples with (X, Z)=(Y, V), (Al, V), (In, Ta), (In, Sb), (Ga, V), and (Sc, Sb) are at −10° C. −12° C., −40° C., −60° C., −40° C., and −45° C., respectively. Consequently, their usable temperature ranges may be limited to that portion of the military specified temperature range above $T_c$ where the materials are paraelectric.

A figure of merit (FOM) was developed by the present inventors, to aid in further evaluating the materials. This FOM is defined as the absolute value of the ratio of the change in ε due to electric field at a given temperature divided by the slope of ε versus T at that temperature, and represented by the following equation:

$$FOM = \left|\left(\frac{\Delta\varepsilon}{\Delta E}\right)_T \div \left(\frac{\partial\varepsilon}{\partial T}\right)_T\right| \qquad \text{(II)}$$

Ideally, Δε/ΔE should be maximized, which is a measure of tunability, and ∂ε/∂T should be minimized, which measures the degree of dielectric constant instability with respect to temperature. The FOM results for the Reference Samples, $X^{4+}$ valence substitutions for Ti in the Reference Sample BST64, and for valency binary substitutions for Ti in Reference Sample BST64 are shown in Table V, as shown in FIG. 26. These were computed for 20° C. and for the minimum and maximum temperature bracketing the range of measurements in which the material was tunable and paraelectric. For materials which were paraelectric down to the lowest temperature measured, the minimum temperature is $T_{min}^P=T_{min}$, for materials whose $T_c$ fell within the mil spec range, the minimum temperature is $T_{min}^P=T_c^{E=0}$, and the maximum temperature is $T_{max}$ (see Tables III and IV, as shown in FIGS. 24 and 25, respectively).

An object of the present inventors was to find materials with the highest FOM, finite tunability, and the most constant ε(0). It was found that materials with $T_{max}$<100° C. cease to tune at $T_{max}$. Since the FOM is monotonic over this temperature range, the range of the FOM can be ascertained. This included the (X, V)- and XSb-substituted materials and all the 4+ substitutions except Zr. In contrast, the FOM at 100° C. for the (X, Ta)-substitutions was finite and was thus finite over the whole mil spec range. Of the 3% charge compensating pair (X, Ta) for 6% of Ti samples, the sample with the lowest range of dielectric constant that tunes over the military specification temperature range (the (Y, Ta)

sample) does not have the highest FOM, and has an even lower range of dielectric constant at the 5% charge compensating pair for 10% Ti substitution level.

The room temperature $\epsilon(0)$ and loss tangents at 1 kHz are given in Table VI, as shown in FIG. 27. A measurement on Rogers RT Duroid # D5880 is shown for comparison. The room-temperature $\epsilon(0)$ at 1 MHz sampling frequency is shown for comparison, and a reference value for the high frequency dielectric material RT/Duroid D5880 was also measured. In general, the $\epsilon(0)$ value corresponding to each sample was found to be qualitatively similar at both frequencies. This is consistent with frequency dependence previously measured in the paraelectric regime.

ANALYSIS USING THE CLAUSIUS-MOSSOTTI EQUATION

Using ionic polarizability sums, the Clausius-Mossotti equation has been used successfully to obtain dielectric constant values that agree with experimental values for simple oxide dielectrics. However, accurate values for dielectric constants of perovskites in the paraelectric state have not been determined using this method. One of the weaknesses for application of the Clausius-Mossotti relation to perovskite materials is the fact that atomic polarizabilities in the perovskite environment have not been determined. It may be important to use a charge density more complex than that obtained using hard sphere approximations.

Figure 28:
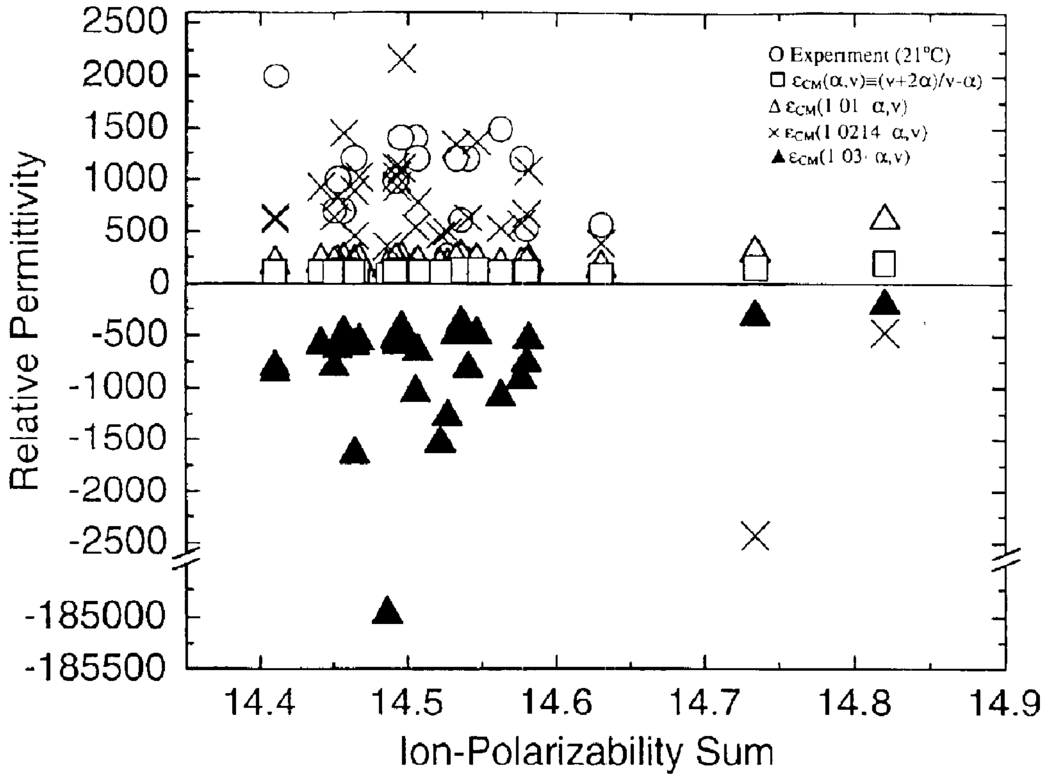
FIG. 28 is a graph of Clausius-Mossotti dielectric constants of the samples described in FIGS. 24, 26 and 27 above vs. the ion polarizability sums of each.
Figure 29:
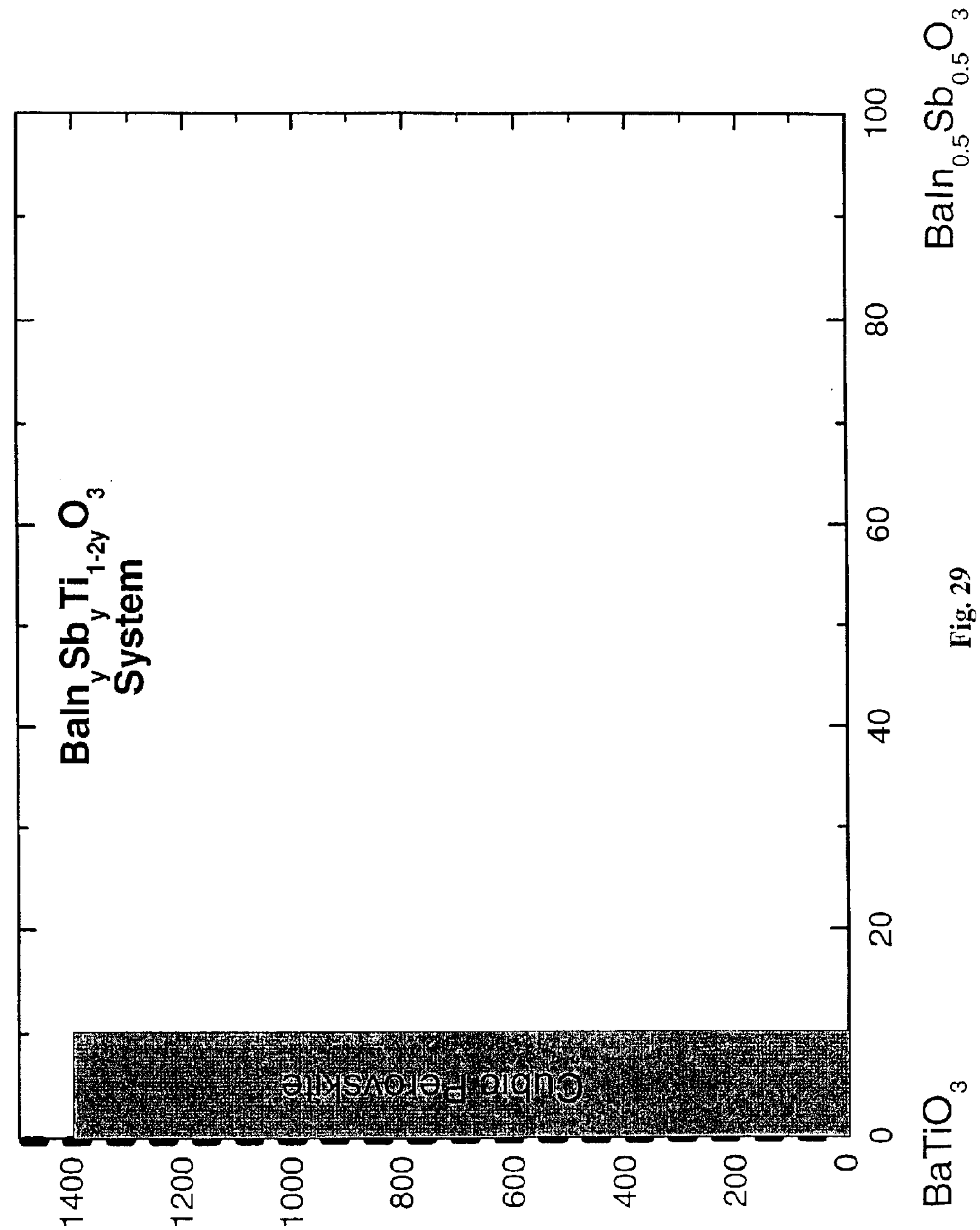
FIG. 29 is the phase diagram illustrating the formation of pseudo-binary compounds, between the materials $BaTiO_3$ and $BaIn_{0.5}Sb_{0.5}O_3$, as described in the first embodiment above, with the solid solution $BaIn_ySb_yTi_{1-2y}O_3$, and the cubic perovskite field of the solid solution $BaIn_ySb_yTi_{1-2y}O_3$ providing particularly useful electric field tunable materials for devices.
Figure 30:
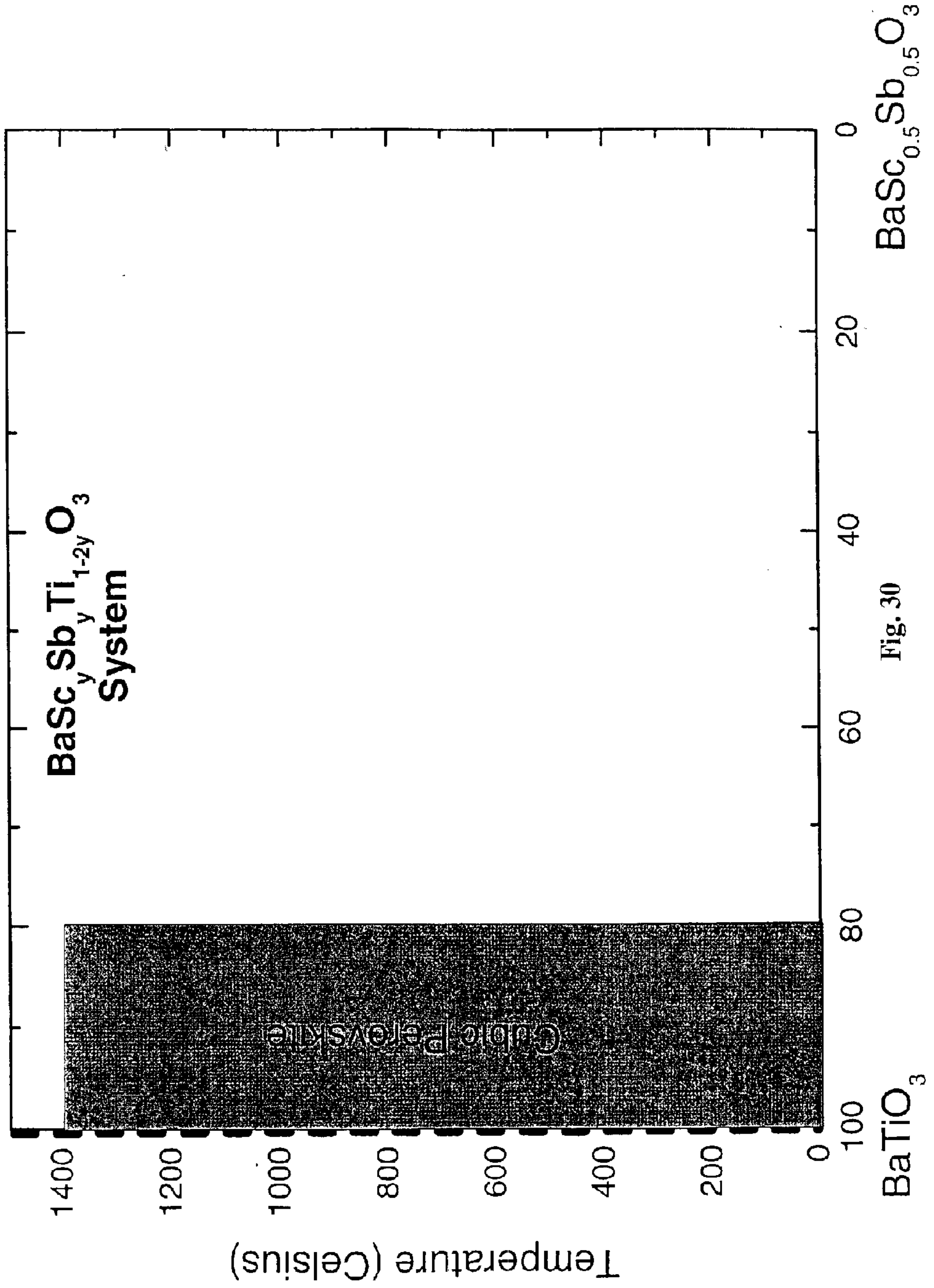
FIG. 30 is the phase diagram illustrating the formation of pseudo-binary compounds, between the materials $BaTiO_3$ and $BaSc_{0.5}Sb_{0.5}O_3$, as described in the second embodiment above, with the solid solution $BaSc_ySb_yTi_{1-2y}O_3$, and the cubic perovskite field of the solid solution $BaSc_ySb_yTi_{1-2y}O_3$ providing particularly useful electric field tunable materials for devices.
Figure 31:
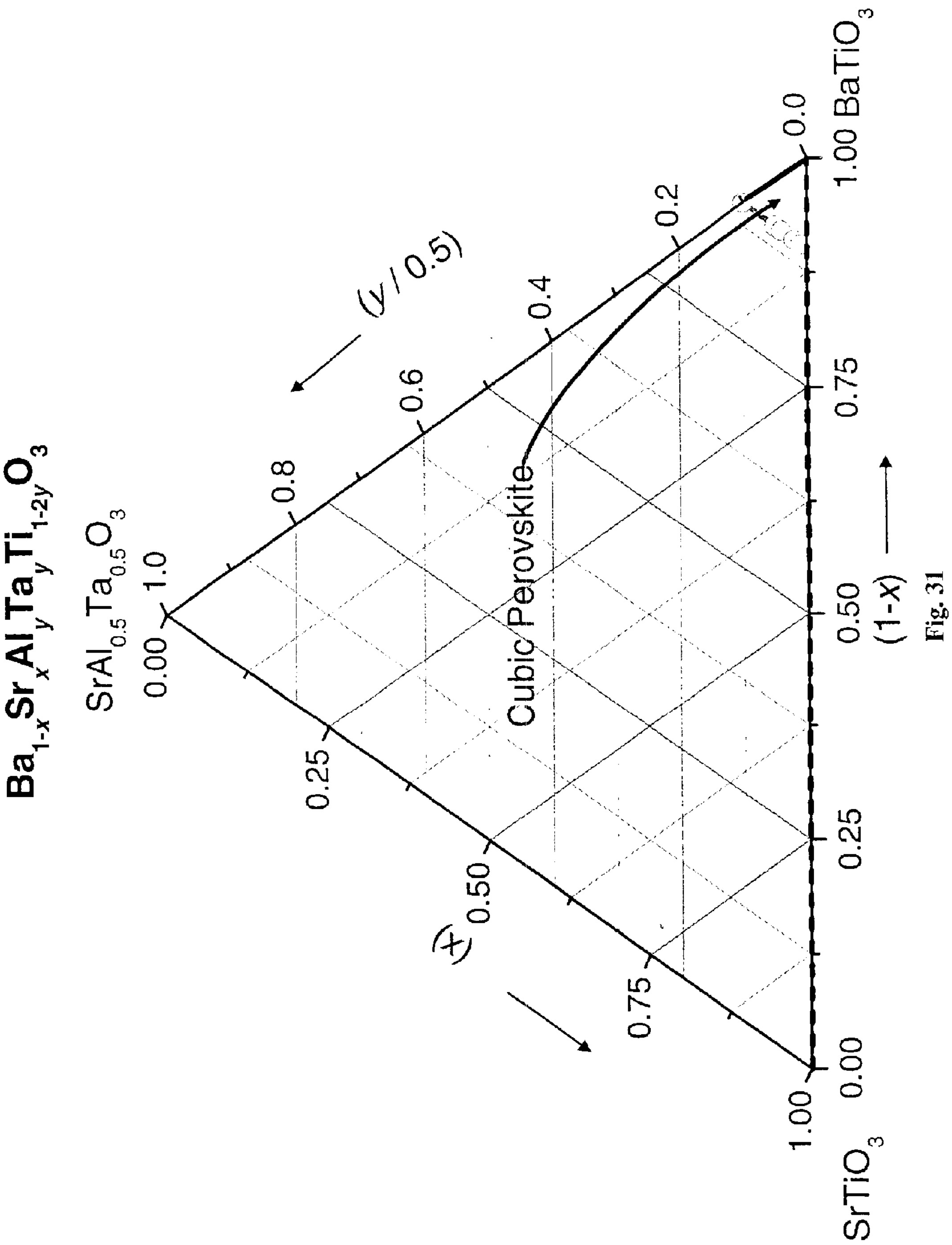
FIG. 31 is the phase diagram illustrating the formation of pseudo-ternary compounds, between the solid solution $Ba_{1-x}Sr_xTiO_3$ and $SrAl_{0.5}Ta_{0.5}O_3$, as described in the third embodiment above, with the solid solution $Ba_{1-x}Ar_xAl_yTa_yTi_{1-2y}O_3$ and with the cubic perovskite field of the solid solution $Ba_{1-x}Sr_xAl_yTa_yTi_{1-2y}O_3$ providing particularly useful electric field tunable materials for devices.
Figure 32:
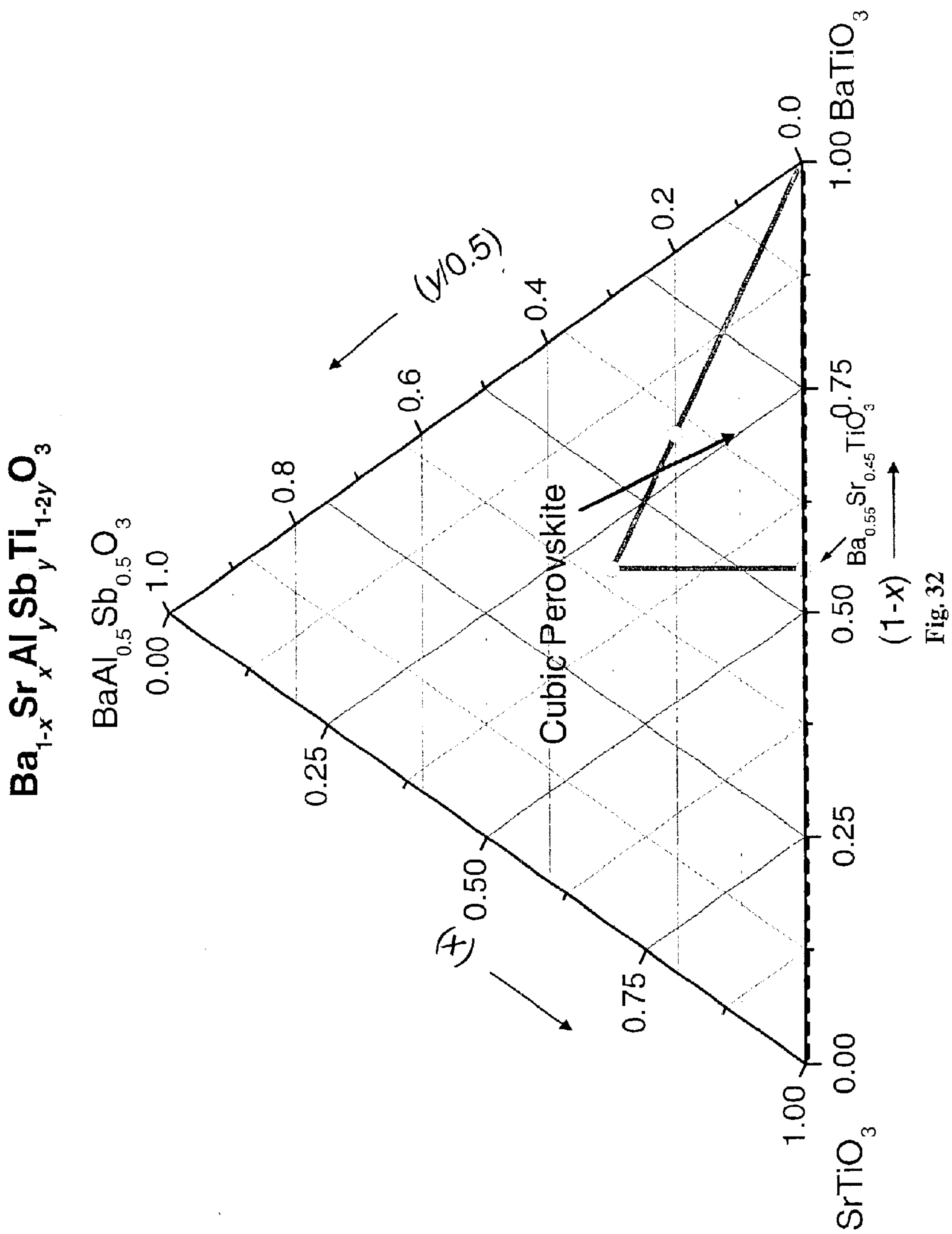
FIG. 32 is the phase diagram illustrating the formation of pseudo-ternary compounds, between the solid solution $Ba_{1-x}Sr_xTiO_3$ and $BaAl_{0.5}Sb_{0.5}O_3$, as described in the fourth embodiment above, with the solid solution $Ba_{1-x}Sr_xAl_ySb_yTi_{1-2y}O_3$ and with the cubic perovskite field of the solid solution $Ba_{1-x}Sr_xAl_ySb_yTi_{1-2y}O_3$ providing particularly useful electric field tunable materials for devices.
Figure 33:
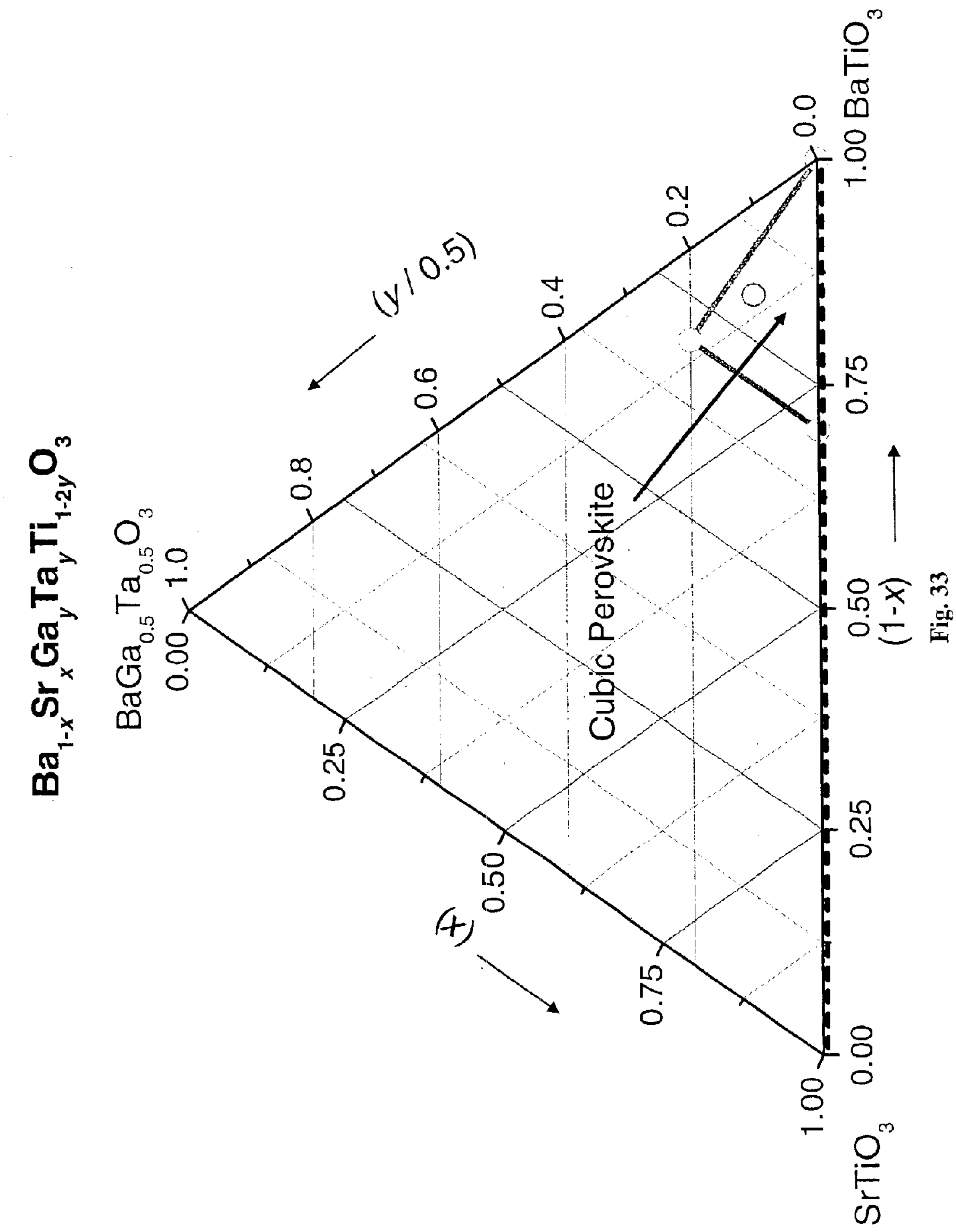
FIG. 33 is the phase diagram illustrating the formation of pseudo-ternary compounds, between the solid solution $Ba_{1-x}Sr_xTiO_3$ and $BaGa_{0.5}Ta_{0.5}O_3$, as described in the fifth embodiment above, with the solid solution $Ba_{1-x}Sr_xGa_yTa_yTi_{1-2y}O_3$ and with the cubic perovskite field of the solid solution $Ba_{1-x}Sr_xGa_yTa_yTi_{1-2y}O_3$ providing particularly useful electric field tunable materials for devices.
Figure 34:
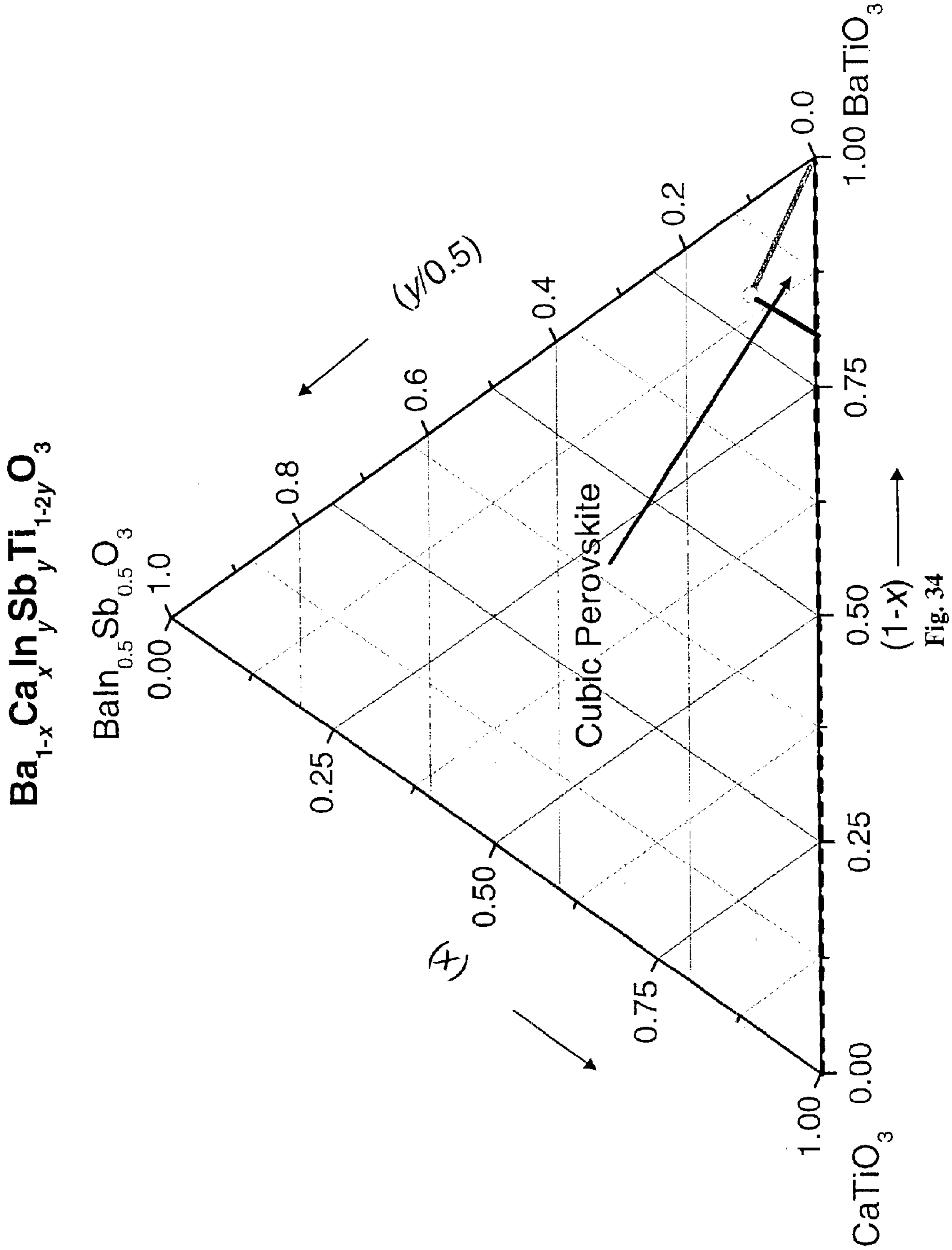
FIG. 34 is the phase diagram illustrating the formation of pseudo-ternary compounds, between $Ba_{1-x}Ca_xTiO_3$ and $BaIn_{0.5}Sb_{0.5}O_3$, as described in the sixth embodiment above, with the solid solution $Ba_{1-x}Ca_xIn_ySb_yTi_{1-2y}O_3$ and with the cubic perovskite field of the solid solution $Ba_{1-x}Ca_xIn_ySb_yTi_{1-2y}O_3$ providing particularly useful electric field tunable materials for devices.
Figure 35:
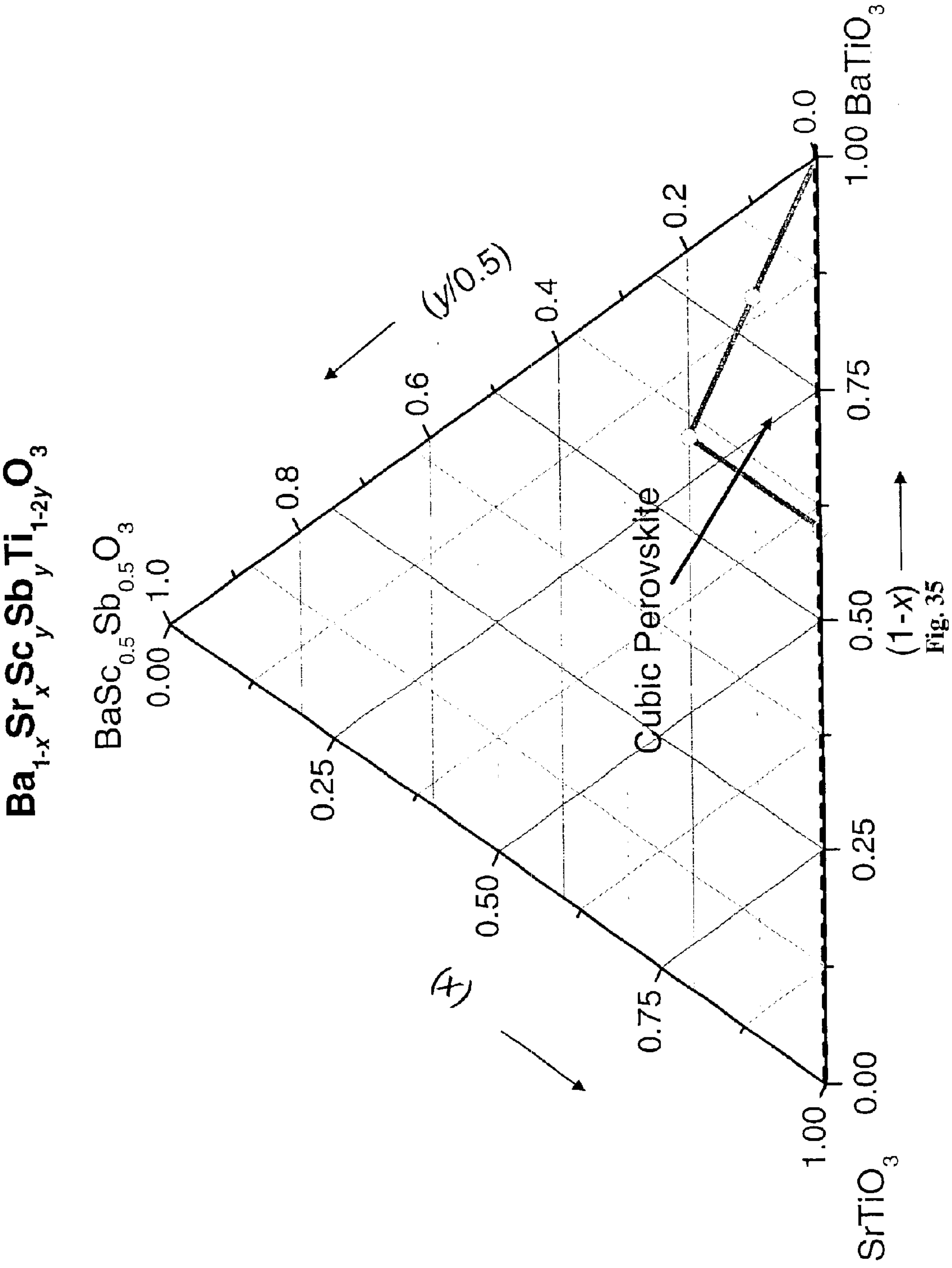
FIG. 35 is the phase diagram illustrating the formation of pseudo-ternary compounds, between the solid solution $Ba_{1-x}Sr_xTiO_3$ and $BaSc_{0.5}Sb_{0.5}O_3$, as described in the seventh embodiment above, with the solid solution $Ba_{1-x}Sr_xSc_ySb_yTi_{1-2y}O_3$ and with the cubic perovskite field of the solid solution $Ba_{1-x}Sr_xSc_ySb_yTi_{1-2y}O_3$ providing particularly useful electric field tunable materials for devices.
Figure 36:
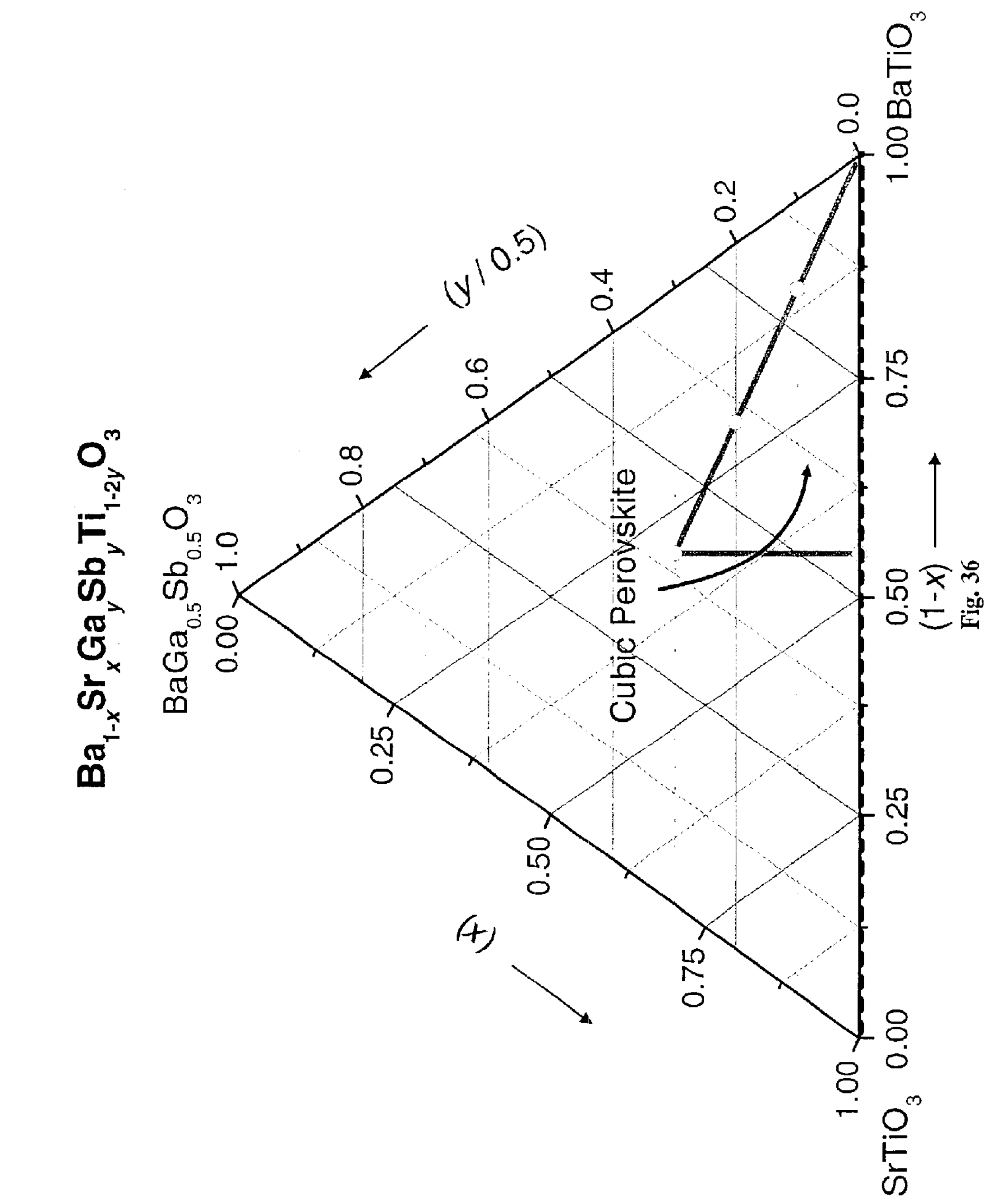
FIG. 36 is the phase diagram illustrating the formation of pseudo-ternary compounds, between the solid solution $Ba_{1-x}Sr_xTiO_3$ and $BaGa_{0.5}Sb_{0.5}O_3$, as described in the eighth embodiment above, with the solid solution $Ba_{1-x}Sr_xGa_ySb_yTi_{1-2y}O_3$ and with the cubic perovskite field of the solid solution $Ba_{1-x}Sr_xGa_ySb_yTi_{1-2y}O_3$ providing particularly useful electric field tunable materials for devices.
Figure 37:
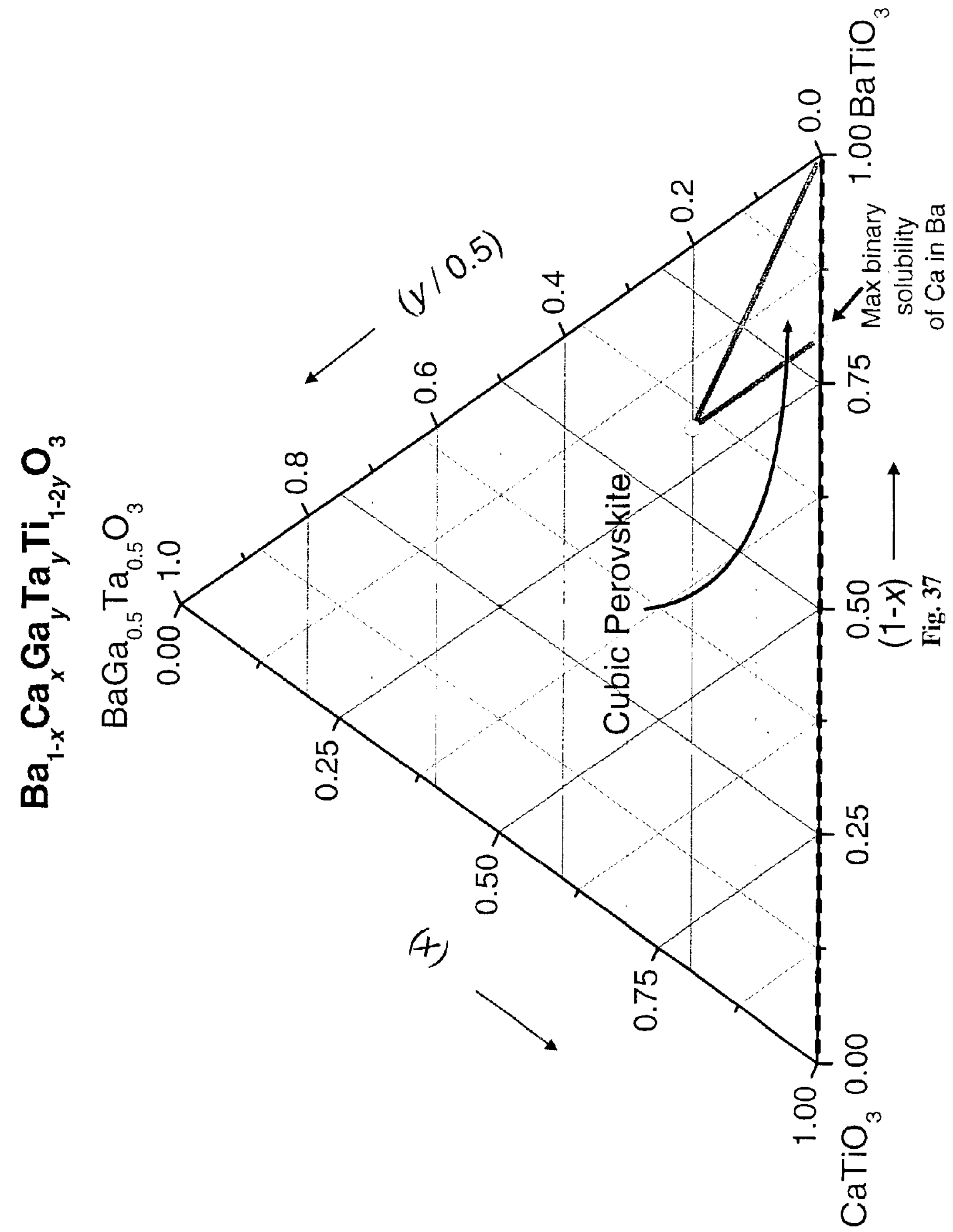
FIG. 37 is the phase diagram illustrating the formation of pseudo-ternary compounds, between $Ba_{1-x}Ca_xTiO_3$ and $BaGa_{0.5}Ta_{0.5}O_3$, as described in the ninth embodiment above, with the solid solution $Ba_{1-x}Ca_xGa_yTa_yTi_{1-2y}O_3$ and with the cubic perovskite field of the solid solution $Ba_{1-x}Ca_xGa_yTa_yTi_{1-2y}O_3$ providing particularly useful electric field tunable materials for devices.
Figure 38:
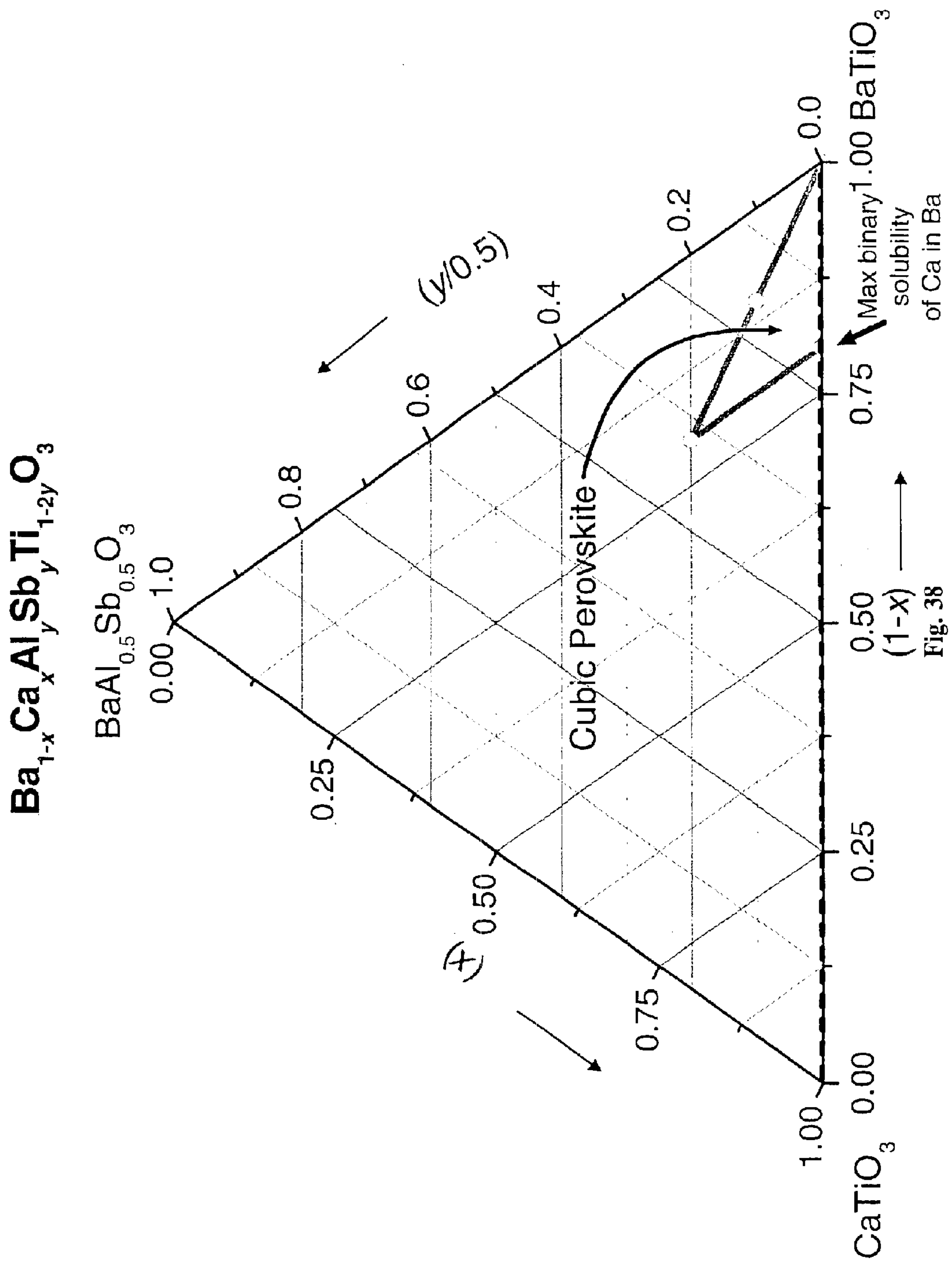
FIG. 38 is the phase diagram illustrating the formation of pseudo-ternary compounds, between $Ba_{1-x}Ca_xTiO_3$ and $BaAl_{0.5}Sb_{0.5}O_3$, as described in the tenth embodiment above, with the solid solution $Ba_{1-x}Ca_xAl_ySb_yTi_{1-2y}O_3$ and with the cubic perovskite field of the solid solution $Ba_{1-x}Ca_xAl_ySb_yTi_{1-2y}O_3$ providing particularly useful electric field tunable materials for devices.
Figure 39:
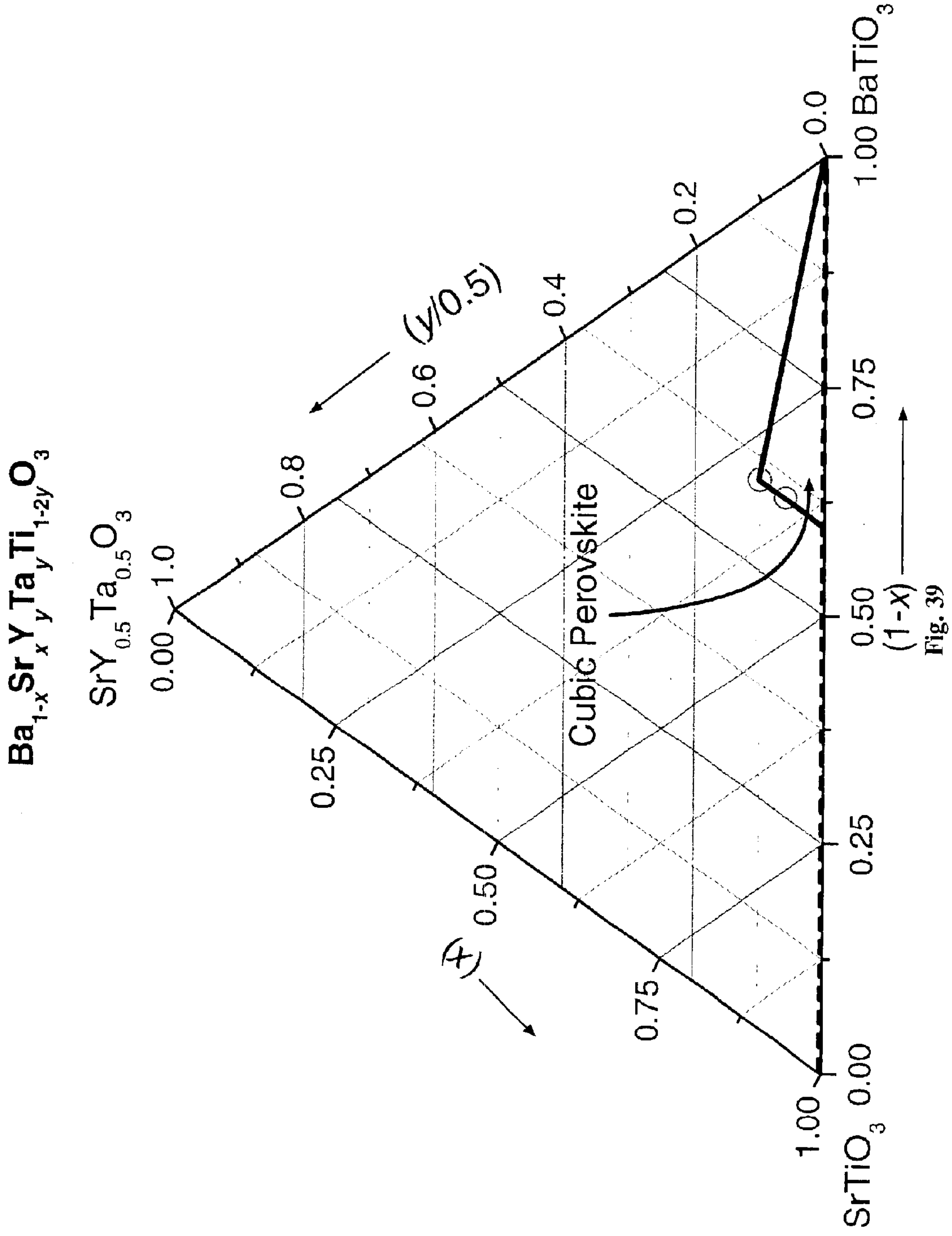
FIG. 39 is the phase diagram illustrating the formation of pseudo-ternary compounds, between the solid solution $Ba_{1-x}Sr_xTiO_3$ and $SrY_{0.5}Ta_{0.5}O_3$, as described in the eleventh embodiment above, with the solid solution $Ba_{1-x}Sr_xY_yTa_yTi_{1-2y}O_3$ and with the cubic perovskite field of the solid solution $Ba_{1-x}Sr_xY_yTa_yTi_{1-2y}O_3$ providing particularly useful electric field tunable materials for devices.
Figure 40:
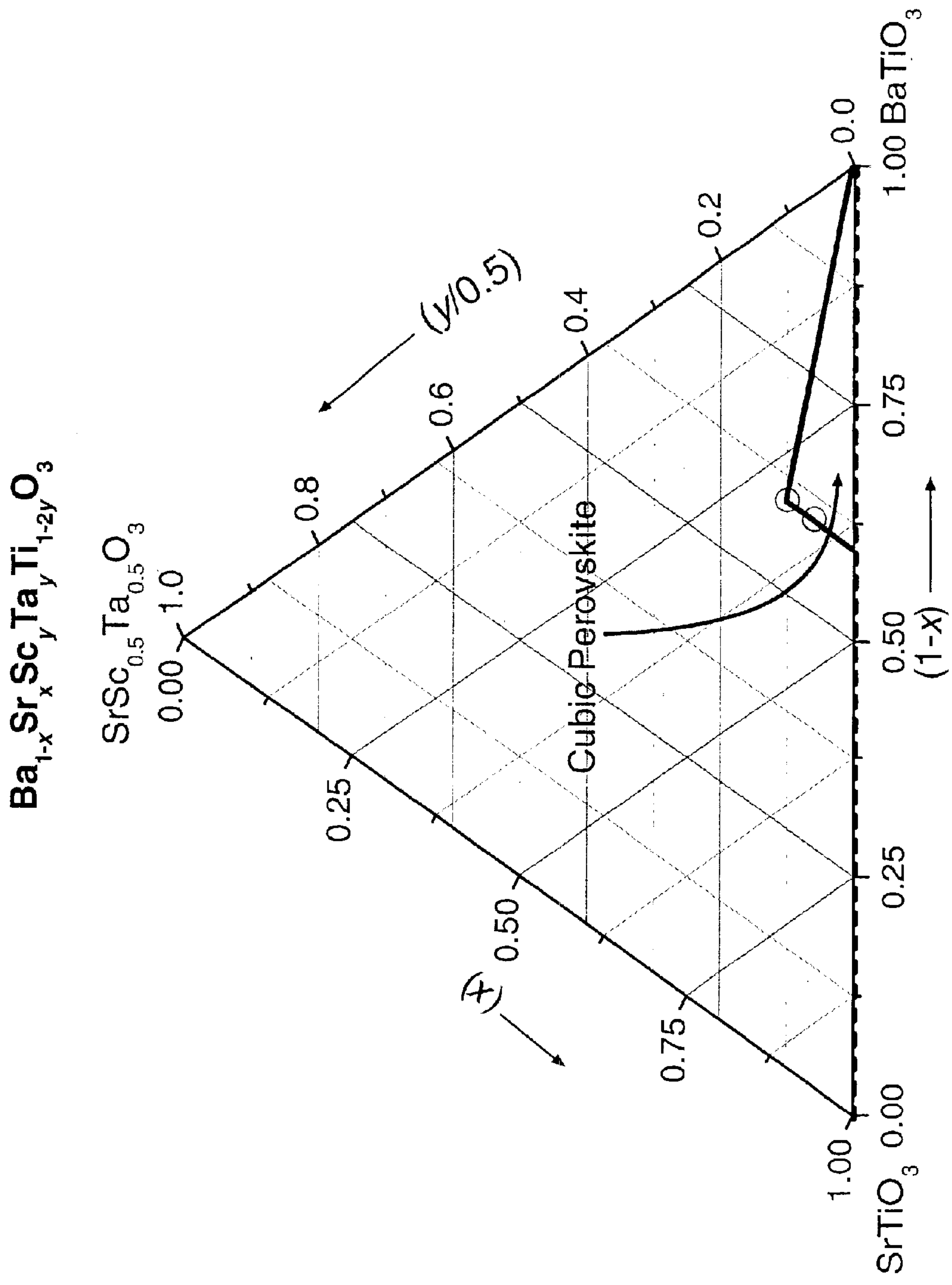
FIG. 40 is the phase diagram illustrating the formation of pseudo-ternary compounds, between the solid solution $Ba_{1-x}Sr_xTiO_3$ and $SrSc_{0.5}Ta_{0.5}O_3$, a cubic field within the system $Ba_{1-x}Sr_xSc_yTa_yTi_{1-2y}O_3$, as described in the twelfth embodiment above, with the solid solution $Ba_{1-x}Sr_xSc_yTa_yTi_{1-2y}O_3$ and with the cubic perovskite field of the solid solution $Ba_{1-x}Sr_xSc_yTa_yTi_{1-2y}O_3$ providing particularly useful electric field tunable materials for devices.

The equation also has a discontinuity at $\alpha=V=4\pi V/3$, where $\alpha$ is the polarizability sum and V is the molar volume. Small changes in $\alpha$ or V near this discontinuity can result in large changes in $\epsilon$, and this condition applies for many perovskites. This is illustrated in FIG. 28 herein, which shows the Clausius-Mossotti dielectric constants of the materials (squares) plotted against the ion polarizabitlity sums. The corresponding room temperature values of $\epsilon(0)$, shown in FIGS. 13(*a*), 14(*a*), 15(*a*), 16(*a*) and 17(*a*) herein, are also plotted for comparison (circles). Polarizabilities, in *J. Appl. Phys.,* R. D. Shannon, 73, 348 (1993), were assumed to be approximately valid and were used to compute the polarizability sums. The lattice constants plotted in FIG. 10 herein were used to obtain the molar volumes. The computed results underestimate the measured $\epsilon(0)$ values.

Three additional plots show the effect upon the results of the computation if the $\alpha$'s used to compute the abscissa are changed by 1–3% (open triangles, X's, and solid triangles for 1%, 2.14%, and 3% increases in $\alpha$, respectively). At $\epsilon(\alpha)\rightarrow\epsilon(1.0214\alpha)$, the least squares fit of the computed dielectric constants to the experimental $\epsilon(0)$ values becomes minimized, while for $\epsilon(\alpha)\rightarrow\epsilon(1.03\alpha)$, the computed dielectric constants all become negative and the physical meaning is not clear.

MICROWAVE MEASUREMENT RESULTS

The $\epsilon(0)$ value at room temperature for a 5% charge compensating pair (Y, Ta) sample with thickness 483 $\mu$m at 20 GHz, $\epsilon=350$, is a factor of two lower than the values obtained at the lower frequencies of 1 kHz and 1 MHz. The corresponding value of Q for the cavity with the sample loaded at 20 GHz is 1466. The loss tangent can be roughly approximated in order to compare samples of equal thickness by $\tan\delta\approx Q^{-1}$. For a BSTMgO sample with the same thickness at 20 GHz and at room temperature, Q=2540 and loss tangent at 25 GHz is reported to be about 0.01 and thus is about a factor of two lower for BSTMgO compared with 5% charge compensating pair (Y, Ta) sample. However, tunability, which is a factor of 3 higher in (Y, Ta) than BSTMgO, as shown in FIG. 24, is far more important, as shown in FIG. 4, than loss tangent, and hence, the performance of the sample with 5% charge compensating pair (Y, Ta) substitution for 10% of Ti is expected to be better than BSTMgO over the entire specified military temperature range.

Thus, the present invention provides single-phase FE/PE materials having lowered, more constant dielectric constants (stable dielectric constants over a wide range of operating temperatures of −50° C. to 100° C.), reasonably low loss tangents (~$10^{-1}$), high tunability, and significant lowering of the Curie temperature, below the temperature range of operation for previous undoped perovskite structures. These FE/PE materials may be used in devices such as phase shifter devices (such as used in cell phones, antennas and the like), variable true time delay devices, steerable beams, tunable filters, impedance transformers, variable control oscillators, antennas, radios, filters, microwave variable capacitors, radar systems, electronic warfare sensors, resonators, microwave TE-FE voltage-controlled oscillators, and other RF tunable devices for synthesizers and systems incorporating all of the above. However, application should not be limited to the above, as the FE materials of the present invention may enhance the performance of various types of electrical devices and electro-optic devices not specifically listed above.

Enhanced tunability and lowered dielectric constant relatively independent of temperature is created by dilute charge-compensated substitutions solely in the Ti site of the perovskite structure claimed herein. Similar charge-compensating substitutions can also be made in the A-site. Importantly, the single-phase structure, especially cubic structures, provided herein allows for pulsed-laser-thin-film deposition, which enables production of very small, lightweight devices that are nonetheless extremely efficient and consume little power.

What is claimed is:

1. Ferroelectric/paraelectric materials comprising pseudo-binary compounds having the chemical formula $BaIn_ySb_yTi_{1-2y}O_3$ where 0<y<0.5.

2. Ferroelectric/paraelectric materials comprising pseudo-binary compounds having the chemical formula $BaSc_ySb_yTi_{1-2y}O_3$ where 0<y<0.5.

3. Ferroelectric/paraelectric materials comprising pseudo-ternary compounds having the chemical formula $Ba_{1-x}Sr_xAl_yTa_yTi_{1-2y}O_3$ where 0<x<1.0 and 0<y<0.5.

4. Ferroelectric/paraelectric materials comprising pseudo-ternary compounds having the chemical formula $Ba_{1-x}Sr_xAl_ySb_yTi_{1-2y}O_3$ where 0<x<1.0 and 0<y<0.5.

5. Ferroelectric/paraelectric materials comprising pseudo-ternary compounds having the chemical formula $Ba_{1-x}Sr_xGa_yTa_yTi_{1-2y}O_3$ where 0<x<1.0 and 0<y<0.5.

6. Ferroelectric/paraelectric materials comprising pseudo-ternary compounds having the chemical formula $Ba_{1-x}Ca_xIn_ySb_yTi_{1-2y}O_3$ where 0<x<1.0 and 0<y<0.5.

7. Ferroelectric/paraelectric materials comprising pseudo-ternary compounds having the chemical formula $Ba_{1-x}Sr_xSc_ySb_yTi_{1-2y}O_3$ where 0<x<1.0 and 0<y<0.5.

8. Ferroelectric/paraelectric materials comprising pseudo-ternary compounds having the chemical formula $Ba_{1-x}Sr_xGa_ySb_yTi_{1-2y}O_3$ where 0<x<1.0 and 0<y<0.5.

9. Ferroelectric/paraelectric materials comprising pseudo-ternary compounds having the chemical formula $Ba_{1-x}Ca_xGa_yTa_yTi_{1-2y}O_3$ where 0<x<1.0 and 0<y<0.5.

10. Ferroelectric/paraelectric materials comprising pseudo-ternary compounds having the chemical formula $Ba_{1-x}Ca_xAl_ySb_yTi_{1-2y}O_3$ where 0<x<1.0 and 0<y<0.5.

11. Ferroelectric/paraelectric materials comprising pseudo-ternary compounds having the chemical formula $Ba_{1-x}Sr_xY_yTa_yTi_{1-2y}O_3$ where 0<x<1.0 and 0<y<0.5.

12. Ferroelectric/paraelectric materials comprising pseudo-ternary compounds having the chemical formula $Ba_{1-x}Sr_xSc_yTa_yTi_{1-2y}O_3$ where 0<x<1.0 and 0<y<0.5

* * * * *